US009350829B2

(12) United States Patent  (10) Patent No.: US 9,350,829 B2
Graham-Cumming  (45) Date of Patent: *May 24, 2016

(54) TRANSPARENT BRIDGING OF TRANSMISSION CONTROL PROTOCOL (TCP) CONNECTIONS

(71) Applicant: CloudFlare, Inc., San Francisco, CA (US)

(72) Inventor: John Graham-Cumming, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/458,144

(22) Filed: Aug. 12, 2014

(65) Prior Publication Data

US 2015/0195382 A1  Jul. 9, 2015

Related U.S. Application Data

(63) Continuation of application No. 14/148,315, filed on Jan. 6, 2014, now Pat. No. 8,806,011.

(51) Int. Cl.
  *G06F 15/16* (2006.01)
  *H04L 29/06* (2006.01)
  *H04L 29/08* (2006.01)

(52) U.S. Cl.
  CPC .......... *H04L 69/161* (2013.01); *H04L 63/1458* (2013.01); *H04L 63/1466* (2013.01); *H04L 67/02* (2013.01); *H04L 63/0281* (2013.01); *H04L 63/123* (2013.01); *H04L 63/166* (2013.01)

(58) Field of Classification Search
  CPC ................... H04L 29/06095–29/06115; H04L 69/161–69/163
  See application file for complete search history.

(56) References Cited

U.S. PATENT DOCUMENTS

| 5,941,988 | A | 8/1999 | Bhagwat |
| 7,284,272 | B2 | 10/2007 | Howard et al. |
| 7,921,282 | B1 | 4/2011 | Mukerji et al. |
| 8,074,275 | B2 | 12/2011 | Ramaiah et al. |
| 8,090,836 | B1 | 1/2012 | Bean et al. |
| 8,359,405 | B1 | 1/2013 | Border et al. |
| 8,543,805 | B2 | 9/2013 | Ovsiannikov |
| 2003/0226034 | A1 | 12/2003 | Howard et al. |

(Continued)

OTHER PUBLICATIONS

Schuba et al., Analysis of a Denial of Service Attack on TCP, 1081-6011/9 IEEE 1997, pp. 208-223.

(Continued)

*Primary Examiner* — Brendan Higa
(74) *Attorney, Agent, or Firm* — Nicholson De Vos Webster & Elliott LLP

(57) ABSTRACT

A transparent TCP proxy device intercepts TCP connection requests received from a TCP client and destined for a TCP server as if acting as the TCP server in a handshake with the TCP client. Only after completing the handshake with the TCP client, the transparent TCP proxy participates in a handshake with the TCP server as if acting as the TCP client. After the handshake with the TCP server is complete, the transparent TCP proxy intercepts and translates subsequent TCP packets received from the TCP client and destined for the TCP server into a form expected by the TCP server including updating an acknowledgement number and TCP checksum; and intercepts and translates subsequent TCP packets received from the TCP server and destined for the TCP client into a form expected by the TCP client including updating an acknowledgement number and TCP checksum.

17 Claims, 8 Drawing Sheets

(56) References Cited

U.S. PATENT DOCUMENTS

| | | |
|---|---|---|
| 2005/0021999 A1 | 1/2005 | Touitou et al. |
| 2005/0050358 A1 | 3/2005 | Lin |
| 2006/0069804 A1 | 3/2006 | Miyake et al. |
| 2007/0283429 A1 | 12/2007 | Chen et al. |
| 2013/0204988 A1 | 8/2013 | Grewal et al. |
| 2013/0263245 A1 | 10/2013 | Sun et al. |

OTHER PUBLICATIONS

Transmission Control Protocol, DARPA Internet Program Protocol Specification, RFC: 793, Sep. 1981, 92 pages.

TRANSPARENT BRIDGING OF TRANSMISSION CONTROL PROTOCOL (TCP) CONNECTIONS

CROSS-REFERENCE TO RELATED APPLICATIONS

This application is a continuation of application Ser. No. 14/148,315, filed Jan. 6, 2014, which is hereby incorporated by reference.

FIELD

Embodiments of the invention relate to the field of networking; and more specifically to transparently bridging Transmission Control Protocol (TCP) connections.

BACKGROUND

TCP, defined for example in RFC 793, is a widely used protocol of the Internet that allows for reliable and ordered delivery of data. For example web browsers commonly use TCP when connecting to origin servers on the Internet. The TCP segment (sometimes referred to as a TCP packet) includes a header that includes a number of fields including source port, destination port, sequence number, acknowledgement number, data offset, reserved, control bits, window, checksum, urgent pointer, options, padding, and a field for the data. The TCP segment is commonly encapsulated into an IP packet whose header includes a number of fields including among others source IP address, destination IP address, and options.

TCP uses sequence numbers to identify the order of data such that the data may be received out of order and reassembled. A client establishes a TCP connection with a server though a series of messages commonly referred to as a handshake. The handshake includes the client transmitting a TCP SYN message to the server which initiates a TCP connection to the server. The server responds with a TCP SYN-ACK message which acknowledges the TCP SYN message and sets an initial sequence number (ISN) to a value chosen by the server. The client responds with a TCP ACK message that acknowledges the TCP SYN-ACK message and includes an acknowledgement number that is the ISN incremented by one. After these three messages, the TCP connection between the client and the server is established. TCP packets also include a TCP checksum which is the ones' complement sum of certain fields in the TCP header.

A fairly common denial of service (DoS) attack is a SYN flood from one or more clients (which may be participating in a botnet) that causes a high rate of incomplete TCP connections. For example, a half-open connection is a connection where the client has sent SYN message, the server has responded with a SYN-ACK message, and the server is waiting for the client to respond with an ACK message. In a SYN flood attack, malicious client(s) typically send many SYN messages to a TCP server with no intention of ever responding to the SYN-ACK message with an ACK message. The server may maintain state for all half-open connections (e.g., waiting for the client to respond with a TCP ACK message to complete the handshake) and the SYN flood may consume all of the available memory for TCP on the server (an overflowing state table), which may lead to the server failing or denying service to legitimate clients, and it may create a high interrupt rate from the network interface card on the attacked server. Thus, these incomplete TCP connections consume resources on web servers both in CPU time and memory space.

One solution to the overflowing state table is to implement SYN cookies. A SYN cookie is a specifically chosen ISN by the server that allows the server to not maintain the state table but also allows the server to recreate the TCP session so the connection can be established and maintained. The SYN cookie may be based on a timestamp (such that the cookie is valid only for a certain period of time), a maximum segment size (MSS) value selected by the server, and a cryptographic hash computed over the server's IP address and port, the client's IP address and port, and the timestamp. For example, the SYN cookie may be a 32 bit value where the top 5 bits are equal to t mod 32, where t is a 32-bit time counter that increases every 64 seconds; the next 3 bits are an encoding of the MSS selected by the server; and the bottom 24 bits is the result of a cryptographic hash computed over the server's IP address and port, the client's IP address and port, and t. When the server receives an ACK from the client (which should be the SYN cookie value incremented by one), the server subtracts one and checks the value t against the current time to see whether the connection has expired, computes the cryptographic hash to determine whether it is a valid SYN cookie, and uses the MSS to reconstruct the SYN queue entry.

The use of TCP SYN cookies addresses the problem of the overflowing state table, but it does not address the problem of the high interrupt rate caused by incomplete TCP connections (e.g., caused by a SYN flood attack). The high interrupt rate causes the CPU load on the attacked machine to be increased which may starve it of CPU time for other legitimate purposes. For example, the CPU on the attacked machine is forced to perform calculations necessary for TCP connection establishment such as TCP checksumming. In a significant denial of service attack, the CPU starvation can be significant.

Some TCP servers (e.g., web servers, proxy servers, etc.) may be configured to accept TCP connections from only known and approved source IP addresses. For example, upon receiving a TCP SYN message from a TCP client, the TCP server may check whether the source IP address of the encapsulating IP packet is of a known and approved source IP address. If the source IP address is not known or approved, then the TCP server will not accept the TCP connection.

The entity controlling the TCP server may not control or manage the IP addresses of TCP clients. Thus, the entity controlling the TCP server may not necessarily know the IP addresses of TCP clients that it should accept connections from or know the IP addresses of TCP clients that it should not accept connections from. In addition, the IP addresses of TCP clients may and often change. In some instances, the entity controlling the TCP server may receive a list of IP addresses that it should accept connections from (a whitelist of IP addresses) and/or a list of IP addresses that it should not accept connections from (a blacklist of IP addresses). These IP addresses would be installed in the server or firewall in front of the server and used to accept or deny connections. The use of such a list is subject to a synchronization problem if the IP addresses of legitimate TCP clients are changed and the list is not updated accordingly. Also the list may be subject to abuse if the list of IP addresses is compromised such that malicious users could use that knowledge to spoof its source IP address such that they look like legitimate TCP clients.

SUMMARY

In one embodiment, a transparent TCP proxy device intercepts TCP connection requests received from a TCP client and destined for a TCP server as if acting as the TCP server in a handshake with the TCP client. Only after completing the handshake with the TCP client, the transparent TCP proxy participates in a handshake with the TCP server as if acting as the TCP client. After the handshake with the TCP server is complete, the transparent TCP proxy intercepts and translates subsequent TCP packets received from the TCP client and destined for the TCP server into a form expected by the TCP server including updating an acknowledgement number and TCP checksum; and intercepts and translates subsequent TCP packets received from the TCP server and destined for the TCP client into a form expected by the TCP client including updating an acknowledgement number and TCP checksum.

In one embodiment, a method in a transparent TCP proxy for transparent bridging of TCP connections includes intercepting a first TCP SYN packet sent from a TCP client and destined for a TCP server that initiates a TCP connection between the TCP client and the TCP server; transmitting a first TCP SYN-ACK packet to the TCP client as if the transparent TCP proxy is the TCP server in response to intercepting the first TCP SYN packet, where the first TCP SYN-ACK packet includes a first sequence number that is chosen by the transparent TCP proxy, where the first sequence number is a first initial sequence number (ISN); intercepting a first TCP ACK packet sent from the TCP client and destined for the TCP server in response to transmitting the first TCP SYN-ACK packet, where the first TCP ACK packet acknowledges receipt of the TCP client of the first TCP SYN-ACK packet; transmitting, in response to intercepting the first TCP ACK packet, a second TCP SYN packet to the TCP server as if the transparent TCP proxy is the TCP client, where the second TCP SYN packet is substantially the same as the first TCP SYN packet; intercepting a second TCP SYN-ACK packet sent from the TCP server and destined for the TCP client in response to transmitting the second TCP SYN packet to the TCP server, where the second TCP SYN-ACK packet includes a second sequence number that is chosen by the TCP server, where the second sequence number is a second ISN; transmitting a second TCP ACK packet to the TCP server as if the transparent TCP proxy is the TCP client in response to intercepting the second TCP SYN-ACK packet; calculating and storing a difference between the first ISN included in the first TCP SYN-ACK packet and the second ISN included in the second TCP SYN-ACK packet; intercepting a first data packet sent from the TCP client and destined for the TCP server, where the first data packet includes a first acknowledgement number based on the first sequence number, and where the first data packet includes a first TCP checksum; updating the first acknowledgement number to a second acknowledgement number using the difference between the first ISN and the second ISN so that the updated acknowledgement number is a value that is expected by the TCP server; calculating a second TCP checksum that uses the second acknowledgement number instead of the first acknowledgement number; transmitting a second data packet to the TCP server as if the transparent TCP proxy is the TCP client, where the second data packet includes the second acknowledgement number and the second TCP checksum; intercepting a third data packet sent from the TCP server and destined for the TCP client, where the third data packet includes a third TCP checksum and a third sequence number; updating the third sequence number to a fourth sequence number using the difference between the first sequence number and the second sequence number so that the fourth sequence number is a value that is expected by the TCP client; calculating a fourth TCP checksum that uses the fourth sequence number instead of the third sequence number; transmitting a fourth data packet to the TCP client as if the transparent TCP proxy is the TCP server, where the fourth data packet includes the fourth TCP checksum and the fourth sequence number; calculating and storing a difference between the first TCP checksum and the second TCP checksum; intercepting a fifth data packet transmitted from the TCP client and destined for the TCP server, where the fifth data packet includes a third acknowledgement number and a fifth TCP checksum; updating the third acknowledgement number to a fourth acknowledgement number using the difference between the first sequence number and the second sequence number so that the fourth acknowledgement number is a value that is expected by the TCP server; updating the fifth TCP checksum to a sixth TCP checksum using the difference between the first TCP checksum and the second TCP checksum; transmitting a sixth data packet to the TCP server as if the transparent TCP proxy is the TCP client, where the sixth data packet includes the fourth acknowledgement number and the sixth TCP checksum; calculating and storing a difference between the third TCP checksum and the fourth TCP checksum; intercepting a seventh data packet transmitted from the TCP server and destined for the TCP client, where the seventh data packet includes a seventh TCP checksum and a fifth sequence number; updating the fifth sequence number to a sixth sequence number using the difference between the first sequence number and the second sequence number so that the sixth sequence number is a value that is expected by the TCP client; updating the seventh TCP checksum to an eighth TCP checksum using the difference between the third TCP checksum and the fourth TCP checksum; and transmitting an eighth data packet to the TCP client as if the transparent TCP proxy is the TCP server, where the eighth data packet includes the eighth TCP checksum and the sixth sequence number.

In one embodiment, a TCP receiver receives a SYN segment from a TCP initiator that initiates a TCP handshake between the TCP initiator and a TCP server. A first value is extracted from a predefined portion of the SYN segment. A second value is computed using an authentication algorithm that includes at least using a cryptographic hash function that takes as input at least the source IP address of the encapsulating IP packet of the SYN segment and a shared secret between the TCP initiator and the TCP receiver. If the computed second value matches the extracted first value, then the TCP handshake is allowed to continue. If the computed second value does not match the extracted first value, then the TCP handshake is not allowed to continue.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
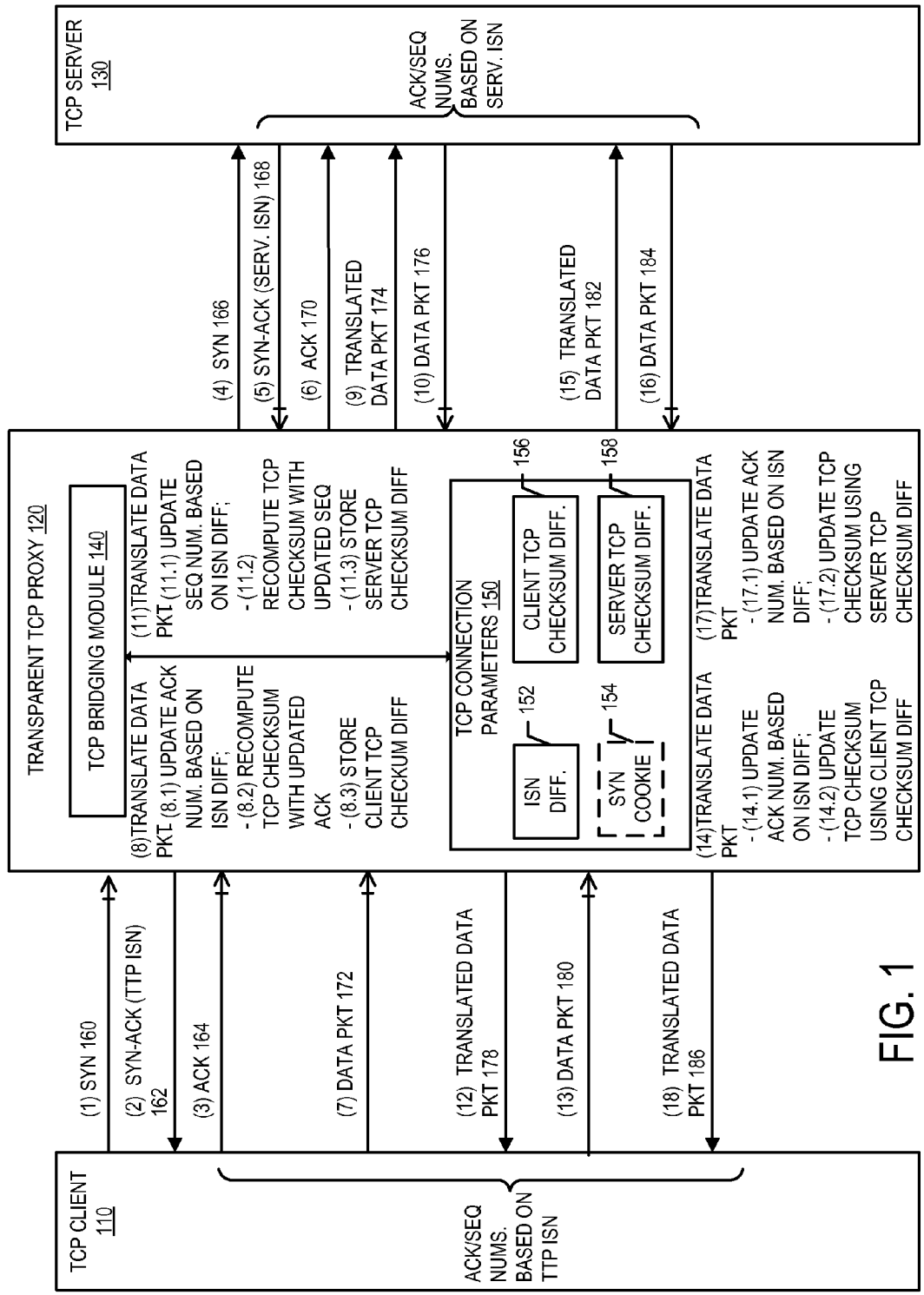
FIG. 1 illustrates an exemplary system for transparently bridging TCP connections according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Transparent Bridging of TCP Connections

A method and apparatus for transparent bridging of TCP connections is described. In one embodiment, a transparent TCP proxy sits between a TCP client and a TCP server that intercepts TCP packets and only passes fully established TCP connections to the TCP server. The transparent TCP proxy intercepts the initial SYN packet from the TCP client that initiates the TCP connection between the TCP client and the TCP server. The transparent TCP proxy replies to the SYN packet as if it was the TCP server with a SYN-ACK packet (e.g., the source IP address is an address of the TCP server). The SYN-ACK packet includes an initial sequence number (ISN) selected by the transparent TCP proxy. The selected ISN may be a SYN cookie. Only after intercepting an ACK packet from the TCP client that completes the handshake between the TCP client and the transparent TCP proxy, the transparent TCP proxy transmits a SYN packet to the TCP server that appears to be from the TCP client to initiate the TCP handshake between the transparent TCP proxy and the TCP server. The transparent TCP proxy and the TCP server complete the TCP handshake which includes the transparent TCP proxy intercepting a SYN-ACK packet with an ISN selected by the TCP server. The ISN selected by the transparent TCP proxy will most likely be different than the ISN selected by the TCP server. After the two handshakes are complete and both ends of the TCP connection are established, the transparent TCP proxy bridges the connections by intercepting and translating each additional TCP packet between the TCP client and the TCP server.

The transparent TCP proxy does not implement a TCP state machine in some embodiments. Thus, the transparent TCP proxy does not terminate the TCP connections. Instead, the transparent TCP proxy passes packets between the TCP client and the TCP server and updates the sequence number or acknowledgement number as appropriate and also updates the TCP checksum as appropriate.

TCP packets sent from the TCP client and destined for the TCP server that are intercepted by the transparent TCP proxy will include an acknowledgement number that is determined in part on the ISN selected by the transparent TCP proxy. The acknowledgement number is the value of the next sequence number the sender of the TCP packet is expected to receive. Since the ISN selected by the transparent TCP proxy is likely different than the ISN selected by the TCP server, the transparent TCP proxy updates the acknowledgement number in TCP packets it intercepts from the TCP client that are destined for the TCP server with an acknowledgement number that is determined in part on the ISN selected by the TCP server. For example, the transparent TCP proxy updates the acknowledgement number based on the difference between the ISN selected by the transparent TCP proxy and the ISN selected by the TCP server. The transparent TCP proxy does not need to modify the sequence number in ACKs intercepted from the TCP client and destined for the TCP server because these sequence numbers are not dependent on the ISN selected by the transparent TCP proxy.

TCP packets sent from the TCP server that are destined for the TCP client will include a sequence number that is determined in part on the ISN selected by the TCP server. Since the TCP client expects TCP packets with sequence numbers based on the ISN selected by the transparent TCP proxy, the transparent TCP proxy updates the sequence number in TCP packets it intercepts from the TCP server that are destined for the TCP client with a sequence number that is determined in part on the ISN selected by the transparent TCP proxy. For example, the transparent TCP proxy updates the sequence number based on the difference between the ISN selected by the transparent TCP proxy and the ISN selected by the TCP server. The transparent TCP proxy does not need to modify the acknowledgment number in ACKs intercepted from the TCP server and destined for the TCP client because these acknowledgement numbers are not dependent on the ISN selected by the TCP server.

TCP packets include a TCP checksum which is the ones' complement sum of certain fields in the TCP header. Modifying the acknowledgement number or the sequence number of the TCP header will change the TCP checksum. Ones' complement addition forms an Abelian Group and is thus associative and commutative. As a result, in one embodiment, the transparent TCP proxy recomputes the TCP checksum after changing the sequence number or acknowledgement number and computes the difference between the initial TCP checksum and the updated TCP checksum. The checksum difference is calculated for each side of the TCP connection (i.e., a TCP checksum difference is calculated between the TCP client and the transparent TCP proxy and a TCP checksum difference is calculated between the TCP server and the transparent TCP proxy). The TCP checksum difference can then be used to update the TCP checksum without requiring the checksum to be fully recalculated on each intercepted TCP packet.

FIG. 1 illustrates an exemplary system for transparently bridging TCP connections according to one embodiment. The system illustrated in FIG. 1 includes the TCP client 110, the transparent TCP proxy 120, and the TCP server 130. The transparent TCP proxy 120 is situated between the TCP client 110 and the TCP server 130 and intercepts at least certain TCP packets as will be described. The TCP client 110 may be any client network application that is initiating a TCP connection with the TCP server. For example, the client network application may be an Internet browser executing on a client device or other any other application that implements TCP. The TCP server 130 may be a web server and may or may not be an origin server that maintains web pages. In a specific embodiment, the TCP server 130 may be a proxy server for one or more origin servers.

The transparent TCP proxy 120 intercepts TCP packets sent by the TCP client 110 destined for the TCP server 130 and intercepts TCP packets sent by the TCP server 130 destined for the TCP client 110. Although FIG. 1 illustrates a single TCP server 130 being connected to the transparent TCP proxy 120, in some embodiments the transparent TCP proxy 120 intercepts TCP packets between multiple TCP clients and multiple TCP servers.

The transparent TCP proxy 120 intercepts and replies to TCP connection attempts to the TCP server 130 (e.g., a SYN packet sent from the TCP client 110) without passing those connection attempts to the TCP server 130 until the TCP connection is fully established. The transparent TCP proxy 120 will only establish a TCP connection with the TCP server 130 on behalf of the TCP client 110 only after the TCP client 110 has established a TCP connection with the transparent TCP proxy 120. To say it another way, if the TCP client 110 does not complete the handshake with the transparent TCP proxy 120 (e.g., it does not transmit an ACK packet in response to the SYN-ACK packet transmitted by the transparent TCP proxy 120), then the transparent TCP proxy 120 will not establish a TCP connection on behalf of the TCP client 110 with the TCP server 130. Since connection attempts are not passed to the TCP server 130 until after the TCP client 110 has fully established a TCP connection with the transparent TCP proxy 120, the transparent TCP proxy 120 protects the TCP server 130 against an attack consisting of incomplete TCP connections (e.g., a SYN flood attack), which reduces the high interrupt rate of the TCP server 130 that may otherwise have been experienced during such an attack.

The transparent TCP proxy 120 includes the TCP bridging module 140 that bridges an established TCP connection with the TCP client 110 and an established TCP connection with the TCP server 130. At an operation 1, the TCP bridging module 140 of the transparent TCP proxy 120 intercepts a SYN packet 160 transmitted from the TCP client 110 that is destined for the TCP server 130 at an interface coupling the TCP client 110 and the transparent TCP proxy 120. The SYN packet 160 is transmitted by the TCP client 110 to request a TCP connection to the TCP server 130.

After intercepting the SYN packet 160, the TCP bridging module 140 responds to the request by transmitting a SYN-ACK packet 162 to the TCP client 110 in operation 2 that appears to be from the TCP server 130 (it includes as its source IP address the IP address of the TCP server 130 which was the destination IP address in the SYN packet of operation 1). To say it another way, the TCP bridging module 140 transmits the SYN-ACK packet 162 to the TCP client 110 as if it is the TCP server 130. Thus it appears to the TCP client 110 as if the TCP server 130 transmitted the SYN-ACK packet 162. The SYN-ACK packet 162 includes an ISN selected by the TCP bridging module 140.

For each bridged TCP connection, the transparent TCP proxy 120 stores a set of TCP connection parameters 150 In an embodiment where the TCP bridging module 140 selects the ISN to be a SYN cookie, the TCP bridging module 140 stores information 154 about the SYN cookie for verifying the cookie in the TCP connection parameters 150. For example, the SYN cookie information may indicate the cryptographic hash function used when generating the SYN cookie. The SYN cookie be a 32 bit value where the top 5 bits are equal to t mod 32, where t is a 32-bit time counter that increases every 64 seconds; the next 3 bits are an encoding of the MSS selected by the transparent TCP proxy 120; and the final 24 bits is the result of a cryptographic hash over the IP address and port of the TCP server 130, the IP address and port of the TCP client 110, and a current timestamp. Alternatively, the SYN cookie may be a 32 bit value where the top 5 bits are equal to t mod 32, where t is a 32-bit time counter that increases every 64 seconds; the next 3 bits are an encoding of the MSS selected by the transparent TCP proxy 120; and the final 24 bits is the result of a cryptographic hash over the IP address and port of the transparent TCP proxy 120, the IP address and port of the TCP client 110, and a current timestamp.

At operation 3, the TCP bridging module 140 intercepts an ACK packet 164 transmitted from the TCP client 110 and destined for the TCP server 130 in response to the SYN-ACK packet 162. The ACK packet 164 includes an acknowledgement number that is determined in part on the ISN selected by the TCP bridging module 140 and included in the SYN-ACK packet 162. For example, according to the TCP protocol, the acknowledgement number in the ACK packet 164 will be the ISN included in the SYN-ACK packet 162 incremented by one. Assuming that the ACK packet 164 is valid, the handshake will be complete between the TCP client 110 and the transparent TCP proxy 120. At this point the TCP client 110 assumes that it has established a TCP connection with the TCP server 130.

In one embodiment, if a SYN cookie was used as the ISN transmitted to the TCP client 110 in the SYN-ACK packet 162, the TCP bridging module 140 decrements the acknowledgement number by one and verifies that the SYN cookie is valid. For example, the TCP bridging module 14 performs the same cryptographic hash using a current timestamp t to determine whether the values match. If the values match, the SYN cookie is valid. If the values do not match, then the SYN cookie is not valid and the TCP bridging module 140 will not process the TCP connection request further.

If the TCP client 110 was participating in a SYN flood attack or other attack that relied on incomplete TCP connections, it would normally not respond to the SYN-ACK packet 162 by transmitting the ACK packet 164. If the TCP client 110 did not respond to the SYN-ACK packet 162 with a valid ACK packet, then the transparent TCP proxy 120 will not transmit any SYN packets to the TCP server 130 on behalf of the TCP client 110 for the TCP connection.

However, as illustrated in FIG. 1, because the TCP client 110 transmitted the ACK packet 164, and assuming that the ACK packet 164 is valid, the TCP bridging module 140 will initiate a TCP connection with the TCP server 130 on behalf of the TCP client 110. Thus, since the transparent TCP proxy 120 intercepts connection attempts (SYN packets) and does not transmit them to the TCP server 130 until a TCP client has fully established a TCP connection with the transparent TCP proxy 120 (which is an indication that it is a legitimate request and not part of a SYN flood attack), the transparent TCP proxy 120 protects the TCP server 130 against an attack that includes incomplete TCP connections, which reduces the high interrupt rate of the TCP server 130 may otherwise have been experienced during such an attack (e.g., the TCP server 130 may avoid performing unnecessary computation such as TCP checksumming)

At operation 4, the TCP bridging module 140 transmits a SYN packet 166 to the TCP server 130 to request a TCP connection on behalf of the TCP client 110. The SYN packet 166 includes as its source IP address the source IP address of the TCP client 110. Thus the TCP bridging module 140 transmits the SYN packet 166 to the TCP server 130 as if it is the TCP client 110. The SYN packet 160 and the SYN packet 166 are identical or substantially identical.

At operation 5, the TCP bridging module 140 intercepts a SYN-ACK packet 168 sent from the TCP server 130 and destined for the TCP client 110 at an interface coupling the transparent TCP proxy 120 and the TCP server 130. In one embodiment, the TCP bridging module 140 does not transmit the SYN-ACK packet 168 to the TCP client 110 (in other words, intercepting the SYN-ACK packet 168 prevents that packet from being received at the TCP client 110).

The intercepted SYN-ACK packet 168 includes an ISN selected by the TCP server 130. It is likely that the ISN selected by the TCP bridging module 140 and transmitted in the SYN-ACK packet 162 will be different than the ISN selected by the TCP server 130 and transmitted in the SYN-ACK packet 168. Because subsequent acknowledgement numbers or sequence numbers (depending on the direction of the TCP connection) depend in part on the ISN, the transparent TCP proxy translates the numbers as appropriate which will be described in greater detail later herein. In order to translate the acknowledgement or sequence numbers, the TCP bridging module 140 stores the difference between the ISN selected by the TCP bridging module 140 and included in the SYN-ACK packet 162 and the ISN selected by the TCP server 130 and included in the SYN-ACK packet 168 (the ISN difference 152 stored in the TCP connection parameters 150). The TCP bridging module 140 may compute the difference between the ISNs after receiving the SYN-ACK packet 168.

After intercepting the SYN-ACK packet 168, at operation 6 the TCP bridging module 140 transmits an ACK packet 170 to the TCP server 130. The ACK packet 170 includes as its source IP address the source IP address of the TCP client 110. Thus the TCP bridging module 140 transmits the ACK packet 170 to the TCP server 130 as if it is the TCP client 110. The ACK packet 170 includes an acknowledgement number that is determined in part on the ISN selected by the TCP server 130 and included in the SYN-ACK packet 168. For example, according to the TCP protocol, the acknowledgement number in the ACK packet 170 will be one more than the ISN included in the SYN-ACK packet 168.

After transmitting the ACK packet 170 to the TCP server 130, a TCP connection is considered to be established between the TCP bridging module 140 and the TCP server 130. Thus a first TCP connection is established between the TCP client 110 and the TCP bridging module 140 and a second TCP connection is established between the TCP bridging module 140 and the TCP server 130. After the handshakes are complete, the data transfer portion of the TCP connection commences.

The TCP bridging module 140 intercepts the data packet 172 transmitted from the TCP client 110 and destined for the TCP server 130 at operation 7. The data packet 172 may include a request for a web page, for example. The data packet 172 is referred to as a data packet because it is sent over the established TCP connection, however it also includes the ACK control bit set and includes an acknowledgment number (each segment sent after the connection is established includes a set ACK control bit). The data packet 172 includes an acknowledgement number that is derived in part on the ISN selected by the TCP bridging module 140 and included in the SYN-ACK packet 162.

At operation 8, the TCP bridging module translates the data packet 172 into a form that is expected by the TCP server 130. For example, since the value of the acknowledgement number included in the data packet 172 will not be a value expected by the TCP server 130 (since it is based in part on the ISN selected by the TCP bridging module 140 and not based in part on the ISN selected by the TCP server 130), the TCP bridging module 140 updates the acknowledgement number based on the difference between the ISNs (the ISN difference 152) in operation 8.1. For example, if the ISN selected by the TCP bridging module 140 is 100 and the ISN selected by the TCP server 130 is 500, then the TCP bridging module 140 will add 400 to the acknowledgement number included in the data packet 172.

Changing the acknowledgement number will also affect the TCP checksum, which is included in the data packet 172 (TCP checksums are typically included in each TCP packet). At operation 8.2, the TCP bridging module 140 recomputes the TCP checksum with the updated acknowledgement number instead of the original acknowledgement number included in the data packet 172. The TCP checksum may be recomputed according to the TCP protocol (e.g., according to RFC 793). At operation 8.3, the TCP bridging module 140 determines and stores the difference between the TCP checksum included in the data packet 172 and the updated TCP checksum. This difference is referred herein as the client TCP checksum difference 156 (stored as part of the TCP connection parameters 150). It should be understood that operation 8.3 may be performed prior, during, or after operation 9, discussed below.

After translating the data packet 172, at operation 9, the TCP bridging module 140 transmits a translated data packet 174 to the TCP server 130. The translated data packet 174 includes as its source IP address the source IP address of the TCP client 110, includes the updated acknowledgement number, and includes the updated TCP checksum. Other than the updated acknowledgement number and the updated TCP checksum, the translated data packet 174 is substantially the same as the data packet 172. Therefore, from the perspective of the TCP server 130, the translated data packet 174 appears to be a packet sent from the TCP client 110.

At operation 10, the TCP bridging module 140 intercepts a data packet 176 transmitted from the TCP server 130 and destined for the TCP client 110 (e.g., sent in response to the translated data packet 174). The data packet 176 includes a sequence number that is based at least in part on the ISN selected by the TCP server 130.

At operation 11, the TCP bridging module translates the data packet 176 into a form that is expected by the TCP client 110. Since the value of the sequence number in the data packet 176 will not be a value expected by the TCP client 110 (since it is based in part on the ISN selected by the TCP server 130 and not based on the ISN selected by the TCP bridging module 140), the TCP bridging module 140 updates the sequence number of the data packet 176 based on the difference between the ISNs (the ISN difference 152) in operation 11.1. For example, if the ISN selected by the TCP bridging module 140 is 100 and the ISN selected by the TCP server 130 is 500, then the TCP bridging module 140 will subtract 400 from the sequence number included in the data packet 176.

Changing the sequence number will also affect the TCP checksum, which is included in the data packet 176. At operation 11.2, the TCP bridging module 140 recomputes the TCP checksum with the updated sequence number instead of the original sequence number included in the data packet 176. The TCP checksum may be recomputed according to the TCP protocol (e.g., according to RFC 793). At operation 11.3, the TCP bridging module 140 determines and stores the difference between the TCP checksum included in the data packet 176 and the updated TCP checksum. This difference is referred herein as the server TCP checksum difference 158 (stored as part of the TCP connection parameters 150). The client TCP checksum difference and the server TCP checksum difference may be different. It should be understood that operation 11.3 may be performed prior, during, or after operation 12, discussed below.

At operation 12, the TCP bridging module 140 transmits a translated data packet 178 to the TCP client 110. The translated data packet 178 includes as its source IP address the source IP address of the TCP server 130, includes the updated sequence number, and includes the updated TCP checksum. Other than the updated sequence number and the updated TCP checksum, the translated data packet 178 is substantially the same as the data packet 176. Therefore, from the perspective of the TCP client 110, the translated data packet 178 appears to be a packet sent from the TCP server 130.

At operation 13, the TCP bridging module 140 intercepts a data packet 180 transmitted from the TCP client 110 and destined for the TCP server 130. The data packet 180 is part of the same TCP connection. The data packet 180 includes an acknowledgement number that is derived in part on the ISN selected by the TCP bridging module 140 and included in the SYN-data packet 162.

At operation 14, the TCP bridging module 140 translates the data packet 180 into a form that is expected by the TCP server 130. The TCP bridging module 140 updates the acknowledgement number based on the difference between the ISNs (the ISN difference 152) in operation 14.1. Since changing the acknowledgement number will also affect the TCP checksum, at operation 14.2 the TCP bridging module 140 updates the TCP checksum using the client TCP checksum difference 156 (e.g., a single 16 bit addition of the client TCP checksum difference 156 with the checksum value in the data packet 180). Although in some embodiments the TCP bridging module 140 may recompute the TCP checksum, since the TCP checksum is the ones' complement sum of certain fields in the header that forms an Abelian Group over the 16 bit numbers in the header, it is both associative and commutative and therefore a single 16 bit addition may be used to update the TCP checksum after once calculating the TCP checksum difference. A single 16 bit addition is faster and less processor intensive than recomputing the TCP checksum.

After translating the data packet, at operation 15 the TCP bridging module 140 transmits the translated data packet 182 to the TCP server 130. The translated data packet 182 includes as its source IP address the source IP address of the TCP client 110, includes the updated acknowledgement number, and includes the updated TCP checksum. Other than the updated acknowledgement number and the updated TCP checksum, the translated data packet 182 is substantially the same as the data packet 180.

At operation 16, the TCP bridging module 140 intercepts a data packet 184 transmitted from the TCP server 130 and destined for the TCP client 110 (e.g., sent in response to the translated data packet 182). The data packet 184 includes a sequence number that is based at least in part on the ISN selected by the TCP server 130.

At operation 17, the TCP bridging module 140 translates the data packet 184 into a form that is expected by the TCP client 110. The TCP bridging module 140 updates the sequence number of the data packet 184 based on the difference between the ISNs (the ISN difference 152) in operation 17.1. Since changing the sequence number will also affect the TCP checksum, at operation 17.2 the TCP bridging module 140 updates the TCP checksum using the server TCP checksum difference 158 (e.g., a single 16 bit addition of the client TCP checksum difference 158 with the checksum value in the data packet 184).

After translating the data packet, at operation 18 the TCP bridging module 140 transmits the translated data packet 186 to the TCP client 110. The translated data packet 186 includes as its source IP address the source IP address of the TCP server 130, includes the updated sequence number, and includes the updated TCP checksum. Other than the updated sequence number and the updated TCP checksum, the translated data packet 186 is substantially the same as the data packet 184.

The TCP bridging module 140 will intercept subsequent TCP packets sent between the TCP client 110 and the TCP server 130 and translate them as appropriate by updating the acknowledgement number or sequence number (depending on the direction of the packet) and updating the TCP checksum. The types of TCP packets that may need translating include TCP FIN packets and other TCP packets where the ACK control bit is set. In this manner, the TCP bridging module 140 transparently bridges TCP packets between the TCP client 110 and the TCP server 130.

The transparent TCP proxy 120 may also implement other rules such as IP address based access control lists to drop packets that are known to be undesirable and/or examine other parts of the IP header or TCP header to detect potentially malicious behavior (e.g., examining for a reduction in the TCP window size which may be indicative of a slow-read attack, filtering based on TCP port, etc.).

Figure 2A:
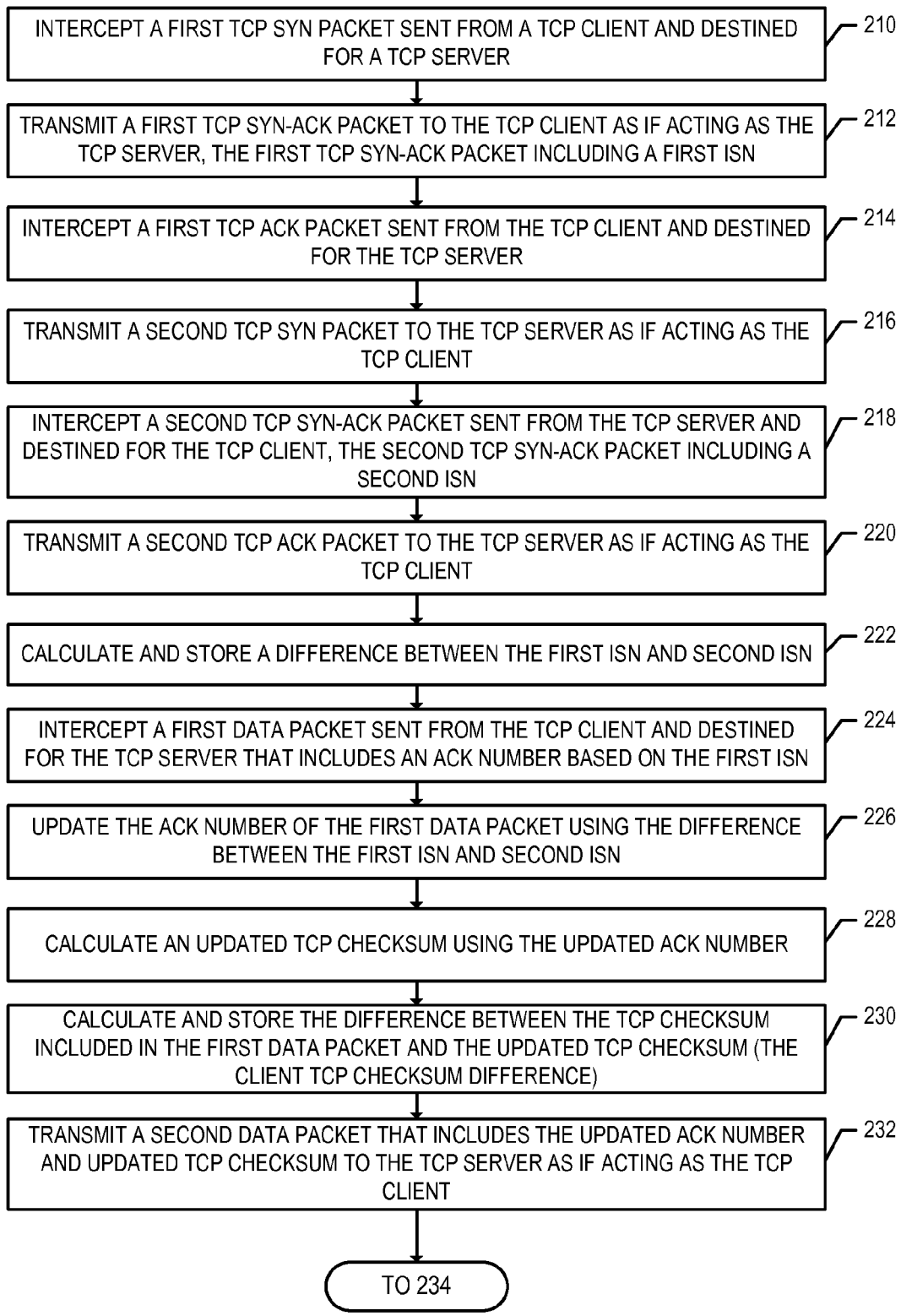
FIG. 2A is part of a flow diagram that illustrates exemplary operations for transparently bridging TCP connections according to one embodiment.
Figure 2B:
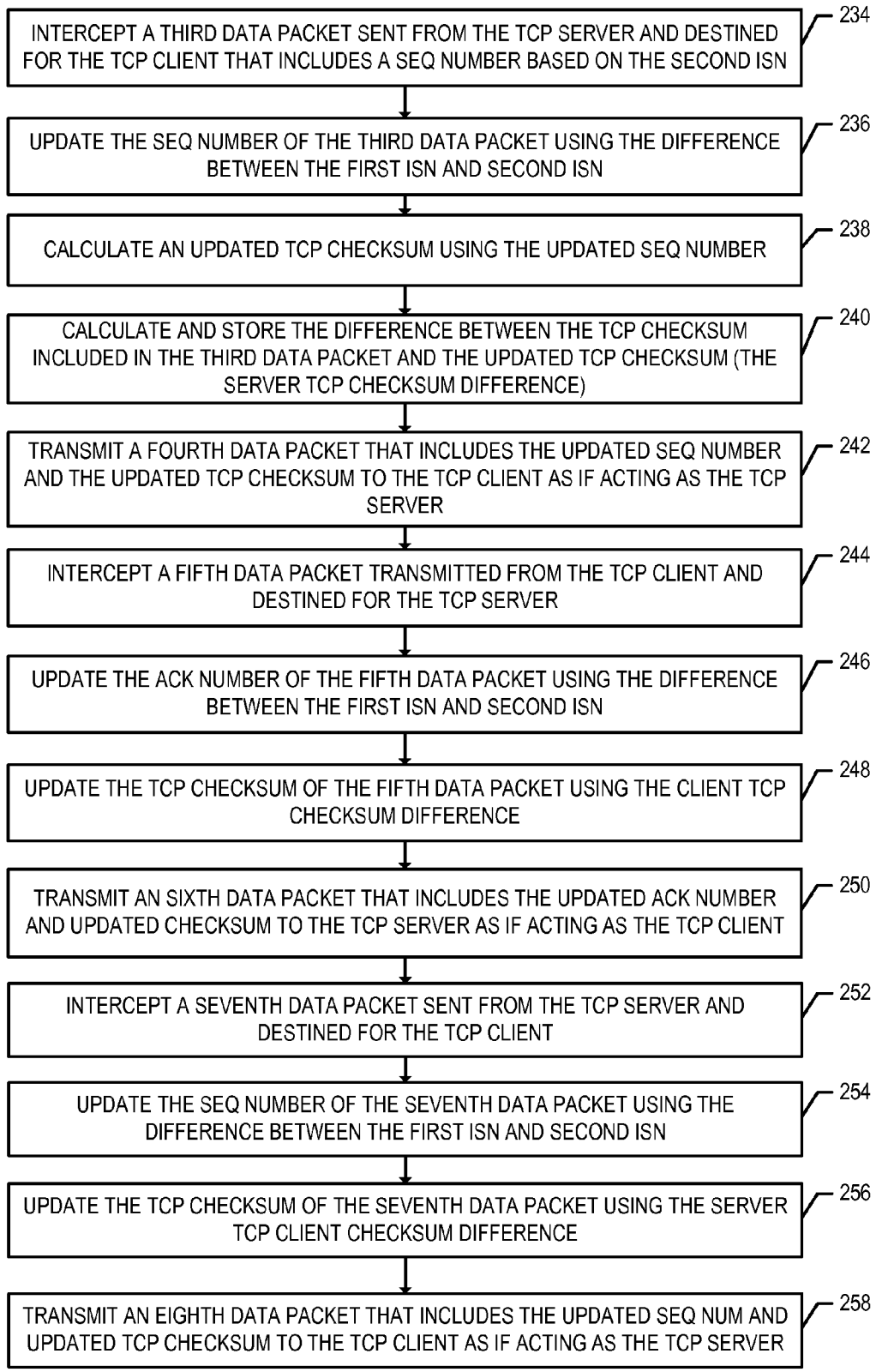
FIG. 2B is part of a flow diagram that illustrates exemplary operations for transparently bridging TCP connections according to one embodiment.

FIGS. 2A-2B are flow diagrams that illustrates exemplary operations for transparently bridging TCP connections according to one embodiment. The operations of FIGS. 2A-2B will be described with respect to the exemplary embodiment of FIG. 1. However, it should be understood that the operations of FIG. 2A-2B can be performed by embodiments other than those discussed with reference to FIG. 1, and the embodiments discussed with reference to FIG. 1 can perform operations different than those discussed with reference to FIG. 2A-2B.

At operation 210, the transparent TCP proxy 120 intercepts a first TCP SYN packet sent from the TCP client 110 and destined for the TCP server 130. This SYN packet is transmitted by the TCP client 110 to initiate a TCP connection to the TCP server 130. The transparent TCP proxy 120 intercepts the SYN packet which prevents it from being received from the TCP server 130 (as described in greater detail later herein, the transparent TCP proxy 120 will transmit a substantially similar SYN packet to the TCP server 130 on behalf of the TCP client 110 only if the TCP client 110 completes the TCP handshake with the transparent TCP proxy 120). Flow moves from operation 210 to operation 212.

At operation 212, the transparent TCP proxy 120 transmits a first TCP SYN-ACK packet to the TCP client 110 as if the transparent TCP proxy is the TCP server 130 in response to intercepting the first TCP SYN packet. For example, the first TCP SYN-ACK packet includes as its source IP address the source IP address of the TCP server 130 (which is the destination IP address of the first TCP SYN packet). The first TCP SYN-ACK packet includes as its sequence number a value chosen by the transparent TCP proxy, which is referred to in the description of FIG. 2 as the first ISN. In one embodiment, the first ISN is a SYN cookie. The use of a SYN cookie allows the transparent TCP proxy 120 to not maintain a state table for this attempted TCP connection. The first TCP SYN-ACK packet also includes the other required information of a SYN-ACK packet as defined by the TCP protocol. Flow moves from operation 212 to operation 214.

At operation 214, the transparent TCP proxy 120 intercepts a first TCP ACK packet that is transmitted from the TCP client 110 that is destined for the TCP server 130. The first TCP ACK packet acknowledges receipt of the first TCP SYN-ACK packet. The first TCP ACK packet includes an acknowledgement number that is based on the ISN included in the first TCP SYN-ACK packet (e.g., the acknowledgement number is one more than the ISN included in the first TCP SYN-ACK packet). If the transparent TCP proxy 120 transmitted a SYN cookie as the ISN, then the transparent TCP proxy 120 verifies the validity of the SYN cookie (after it decrements the acknowledgement number) before continuing. It should be noted that if the TCP client 110 does not transmit the TCP ACK packet or in embodiments where a SYN cookie is used the TCP ACK packet does not include a valid acknowledgement number based on the SYN cookie, the transparent TCP proxy 120 does not complete the handshake and no SYN packets for the TCP connection will be transmitted to the TCP server 130, which protects the TCP server 130 against an attack that uses incomplete TCP connections (e.g., a SYN flood attack) thereby reducing the high interrupt rate of the TCP server 130 that may otherwise have been experienced during such an attack. Flow moves from operation 214 to operation 216.

At operation 216, the transparent TCP proxy 120 transmits, in response to intercepting the first TCP ACK packet, a second TCP SYN packet to the TCP server 130 as if the transparent TCP proxy 120 is the TCP client 110. For example, the second TCP SYN packet includes as its source IP address the source IP address of the TCP client 110. The second TCP SYN packet is substantially the same as the first TCP SYN packet. Flow then moves to operation 218.

At operation 218, the transparent TCP proxy 120 intercepts a second TCP SYN-ACK packet transmitted from the TCP server 130 that is destined for the TCP client 110. The second TCP SYN-ACK packet includes an ISN that is chosen by the TCP server 130. The ISN chosen by the TCP server 130 may be a SYN cookie. The ISN chosen by the TCP server 130 included in the second TCP SYN-ACK packet is likely different than the ISN chosen by the transparent TCP proxy 120 and included in the first TCP SYN-ACK packet. Flow moves from operation 218 to operation 220.

At operation 220, the transparent TCP proxy 120 transmits a second TCP ACK packet to the TCP server 130 as if the transparent TCP proxy 120 is the TCP client 110. For example, the second TCP ACK packet includes as its source IP address the source IP address of the TCP client 110. The second TCP ACK packet includes an acknowledgement number that is based on the ISN included in the second TCP SYN-ACK packet (e.g., the acknowledgement number is one more than the ISN included in the second TCP SYN-ACK packet). Flow then moves to operation 222.

At operation 222, the transparent TCP proxy 120 calculates and stores a difference between the ISN selected by the transparent TCP proxy 120 and included in the first TCP SYN-ACK packet and the ISN selected by the TCP server 130 and included in the second TCP SYN-ACK packet. The difference between these ISNs is used to translate the sequence number or acknowledgement number in subsequent TCP packets. Flow then moves to operation 224, which begins the data transfer portion of the TCP connection.

At operation 224, the transparent TCP proxy 120 intercepts a first data packet transmitted from the TCP client 110 and destined for the TCP server 130. The data packet includes an acknowledgement number that is based on the ISN included in the first TCP SYN-ACK packet (e.g., it may be one more than the ISN included in the first TCP SYN-ACK packet). Like other TCP packets, the first data packet also includes a TCP checksum. Flow moves from operation 224 to operation 226.

Since the acknowledgement number included in the first data packet is based on the ISN included in the first TCP SYN-ACK packet which is chosen by the transparent TCP proxy 120, the transparent TCP proxy 120 updates that acknowledgement number to a value that is expected by the TCP server 130 (e.g., based on the ISN included in the second TCP SYN-ACK packet). Therefore, at operation 226, the transparent TCP proxy 120 updates the acknowledgement number to a value using the difference between the ISN selected by the transparent TCP proxy 120 and included in the first TCP SYN-ACK packet and the ISN selected by the TCP server 130 and included in the second TCP SYN-ACK packet such that the updated acknowledgement number is a value expected by the TCP server 130. By way of example, if the ISN included in the first TCP SYN-ACK packet is 1000 and the ISN included in the second TCP SYN-ACK packet is 500, the transparent TCP proxy 120 will subtract 500 from the acknowledgement number included in the first data packet. Flow then moves to operation 228.

Changing the acknowledgement number affects the TCP checksum of the TCP packet. Therefore, at operation 228, the transparent TCP proxy 120 calculates an updated TCP checksum that takes into account the updated acknowledgement number. The calculation of the TCP checksum may be according to the TCP protocol (e.g., the TCP checksum is the 16 bit ones' complement of the ones' complement sum of all 16 bit words in the header and text).

Flow then moves to operation 230 where the transparent TCP proxy 120 calculates and stores the difference between the TCP checksum included in the first data packet and the updated TCP checksum (the client TCP checksum difference). The client TCP checksum difference is a 16 bit value. The client TCP checksum difference may be used when updating the TCP checksum of subsequent TCP packets the transparent TCP proxy 120 intercepts from the TCP client 110 that are destined for the TCP server 130 during the TCP connection. Flow moves from operation 230 to operation 232.

At operation 232, the transparent TCP proxy 120 transmits a second data packet to the TCP server 130 as if the transparent TCP proxy 120 is the TCP client 110 (e.g., the source IP address of the second data packet is the source IP address of the TCP client 110). The second data packet includes the updated acknowledgement number and the updated TCP checksum. Besides the updated acknowledgement number and the updated TCP checksum, the second data is substantially similar as the first data packet. Flow then moves to operation 234.

At operation 234, the transparent TCP proxy 120 intercepts a third data packet transmitted from the TCP server 130 and destined for the TCP client 110. The third data packet is transmitted in response to the second data packet and includes a TCP checksum and a sequence number that is based in part on the ISN selected by the TCP server 130. Flow then moves to operation 236.

At operation 236, the transparent TCP proxy 120 updates the sequence number to a value using the difference between the ISN selected by the transparent TCP proxy 120 and included in the first TCP SYN-ACK packet and the ISN selected by the TCP server 130 and included in the second TCP SYN-ACK packet such that the updated sequence number is a value expected by the TCP client 110. By way of example, if the ISN included in the first TCP SYN-ACK packet is 1000 and the ISN included in the second TCP SYN-ACK packet is 500, the transparent TCP proxy 120 will add 500 to the sequence number included in the third data packet. Flow then moves to operation 238.

Since changing the sequence number will also affect the TCP checksum, the transparent TCP proxy 120 calculates an updated TCP checksum that takes into account the updated sequence number at operation 238. The calculation of the TCP checksum may be according to the TCP protocol (e.g., the TCP checksum is the 16 bit ones' complement of the ones' complement sum of all 16 bit words in the header and text). Flow then moves to operation 240 where the transparent TCP proxy 120 calculates and stores the difference between the TCP checksum included in the third data packet and the updated TCP checksum (the server TCP checksum difference). The server TCP checksum difference is a 16 bit value. The server TCP checksum difference may be used when updating the TCP checksum of subsequent TCP packets the transparent TCP proxy 120 intercepts from the TCP server 130 that are destined for the TCP client 110 during the TCP connection. Flow moves from operation 240 to operation 242.

At operation 242, the transparent TCP proxy 120 transmits a fourth data packet to the TCP client 110 as if the transparent TCP proxy 120 is the TCP server 130 (e.g., the source IP address of the fourth data packet is the source IP address of the TCP server 130). The fourth data packet includes the updated sequence number and the updated TCP checksum. Besides the updated sequence number and the updated TCP checksum, the fourth data packet is substantially similar as the third data packet. Flow moves from operation 242 to operation 244.

At operation 244, the transparent TCP proxy 120 intercepts a fifth data packet transmitted from the TCP client 110 and destined for the TCP server 130. The fifth data packet includes an acknowledgement number that is based in part on the ISN selected by the transparent TCP proxy 120 and included in the first TCP SYN-ACK packet transmitted to the TCP client 110. Flow then moves to operation 246.

At operation 246, the transparent TCP proxy 120 updates the acknowledgement number of the fifth data packet to a value that is expected by the TCP server 130 (e.g., based on the ISN included in the second TCP SYN-ACK packet) using the difference between the ISN selected by the transparent TCP proxy 120 and included in the first TCP SYN-ACK packet and the ISN selected by the TCP server 130 and included in the second TCP SYN-ACK packet. Flow then moves to operation 248.

At operation 248, the transparent TCP proxy 120 updates the TCP checksum of the fifth data packet using the client TCP checksum difference (e.g., using 16 bit addition). Since the TCP checksum is the ones' complement sum of certain fields in the header, which forms an Abelian Group over the 16 bit numbers in the header, it is both associative and commutative and therefore a single 16 bit addition may be used to update the TCP checksum after once calculating the TCP checksum difference. A single 16 bit addition is faster and less processor intensive than recomputing the TCP checksum. Thus instead of recomputing the TCP checksum in its entirety to account for the updated acknowledgement number, a single 16 bit addition may be used to update the TCP checksum. However, in alternative embodiments, the TCP checksum may be updated by recomputing the TCP checksum. Flow then moves to operation 250.

At operation 250, the transparent TCP proxy 120 transmits a sixth data packet to the TCP server 130 as if the transparent TCP proxy 120 is the TCP client 110 (e.g., the source IP address of the sixth data packet is the source IP address of the TCP client 110). The sixth data packet includes the updated acknowledgement number and the updated TCP checksum. Besides the updated acknowledgement number and the updated TCP checksum, the sixth data packet is substantially similar as the fifth data packet. Flow then moves to operation 252.

At operation 252, the transparent TCP proxy 120 intercepts a seventh data packet transmitted from the TCP server 130 that is destined for the TCP client 110. The seventh data packet includes a sequence number that is based in part on the ISN selected by the TCP server 130. Flow then moves to operation 254.

At operation 254, the transparent TCP proxy 120 updates the sequence number of the seventh data packet to a value that is expected by the TCP client 110 (e.g., based on the ISN included in the first TCP SYN-ACK packet) using the difference between the ISN included in the first TCP SYN-ACK packet and the ISN included in the second TCP SYN-ACK packet. Flow then moves to operation 255.

At operation 256, the transparent TCP proxy 120 updates the TCP checksum of the seventh data packet using the server TCP checksum difference (e.g., using 16 bit addition). Thus instead of recomputing the TCP checksum in its entirety to account for the updated sequence number, a single 16 bit addition may be used to update the TCP checksum. In an alternative embodiment, the TCP checksum may be updated by recomputing the TCP checksum with the updated sequence number. Flow then moves to operation 258.

At operation 258, the transparent TCP proxy 120 transmits an eighth data packet to the TCP client 110 as if the transparent TCP proxy 120 is the TCP server 130 (e.g., the source IP address of the eighth data packet is the source IP address of the TCP server 130). The eighth data packet includes the updated sequence number and the updated TCP checksum. Besides the updated sequence number and the updated TCP checksum, the eighth data packet is substantially similar as the seventh data packet.

The transparent TCP proxy 120 will intercept and translate any subsequent TCP packets transmitted from the TCP client 110 that are destined for the TCP server 130 (in the TCP connection) by updating the acknowledgement number using the ISN difference and updating the TCP checksum using the client TCP checksum difference. The transparent TCP proxy 120 will also intercept and translate any subsequent TCP packets transmitted from the TCP server 130 that are destined for the TCP client 110 (in the TCP connection) by updating the sequence number using the ISN difference and updating the TCP checksum using the server TCP checksum difference.

Thus, using the techniques described above the transparent TCP proxy 120 protects the TCP server 130 against attacks using incomplete TCP connections (e.g., SYN flood attacks) and reduces the high interrupt rate of the TCP server 130 that may otherwise have been experienced during such attacks.

The transparent TCP proxy may be implemented in hardware (e.g., using an application-specific integrated circuit (ASIC)) and/or software. The transparent TCP proxy may be implemented in a network adapter card with one or more processors performing the above described operations.

In a specific embodiment, the TCP server 130 is itself a proxy server for one or more origin servers which may be owned by different entities. The proxy server may provide service(s) for the domains for which the origin servers belong including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), image loading optimization (e.g., deferred image loading and/or auto-resizing), and/or other services. In such an embodiment, the TCP server 130 may receive TCP packets from TCP clients as a result of a Domain Name System (DNS) request for a domain returning an IP address of the TCP server 130.

Authenticating Initiators of TCP Connections

A method and apparatus for authenticating the identity of the initiator of a TCP connection is described. In one embodiment of the invention, when initiating a TCP connection, the TCP initiator generates a TCP SYN segment where a predefined portion of the TCP segment includes a value computed using an authentication algorithm that includes at least the use of a cryptographic hash function that takes as input at least a source of the source IP address of an encapsulating IP packet of the TCP SYN segment and a shared secret between the TCP initiator and the TCP receiver. This computed value is sometimes referred herein as the "initiator authentication value." Upon receipt of the TCP SYN segment, the TCP receiver uses the same authentication algorithm including the same cryptographic hash function that takes as input at least the source IP address of the encapsulating IP packet and the shared secret between the TCP initiator and the TCP receiver to compute a value that is sometimes referred herein as the "receiver authentication value." The TCP receiver compares the receiver authentication value with the initiator authentication value included in the predefined portion of the TCP SYN segment. If the values are the same, the TCP handshake is allowed to continue. If the values are different, the TCP connection is denied.

In one embodiment, the predefined portion of the TCP segment used to store the result of the authentication algorithm (the initiator authentication value) is the TCP sequence number field. In another embodiment, the predefined portion of the TCP segment used to store the result of the authentication algorithm (the initiator authentication value) is a TCP options field.

In one embodiment, part of the predefined portion of the TCP segment can be reserved such that the TCP initiator sets that part of the predefined portion to a random value and computes the initiator authentication value using the authentication algorithm with the cryptographic hash function further taking as input that random value, with the result stored in the remaining part of the predefined portion of the TCP segment. By way of a specific example if the predefined portion is the TCP sequence number field, the first 8 bits may be reserved for a random value and the remaining 24 bits may be used to store the cryptographic hash value on that random value, the source IP address of the encapsulating IP packet, and the shared secret between the TCP initiator and the TCP receiver. Upon receipt of the TCP SYN segment, the TCP receiver extracts the reserved part of the predefined portion and uses the same authentication algorithm as the TCP initiator to compute a value using the extracted part of the predefined portion, the source IP address of the encapsulating IP packet, and the shared secret between the TCP initiator and the TCP receiver. The TCP receiver compares the result of its computed value with the remaining part of the predefined portion of the TCP segment (the part other than the part reserved for the random value). If the values are the same, the TCP handshake will be allowed to continue. If the values are different, the TCP receiver denies the connection.

The TCP receiver may be a TCP receiver for many TCP initiators. In one embodiment, the TCP receiver has a unique shared secret for each TCP initiator. In another embodiment, the same shared secret is used for multiple TCP initiators and the TCP receiver. For example, in embodiments where the TCP initiator is one of multiple nodes in a content delivery network or other distributed network, the same shared secret may be used for each of those nodes and the TCP receiver. Assuming that the shared secret is not compromised, the use of the cryptographic hash function described herein authenticates, with a very high probability, whether the TCP initiator is authorized to initiate a TCP connection with the TCP server.

Figure 3:
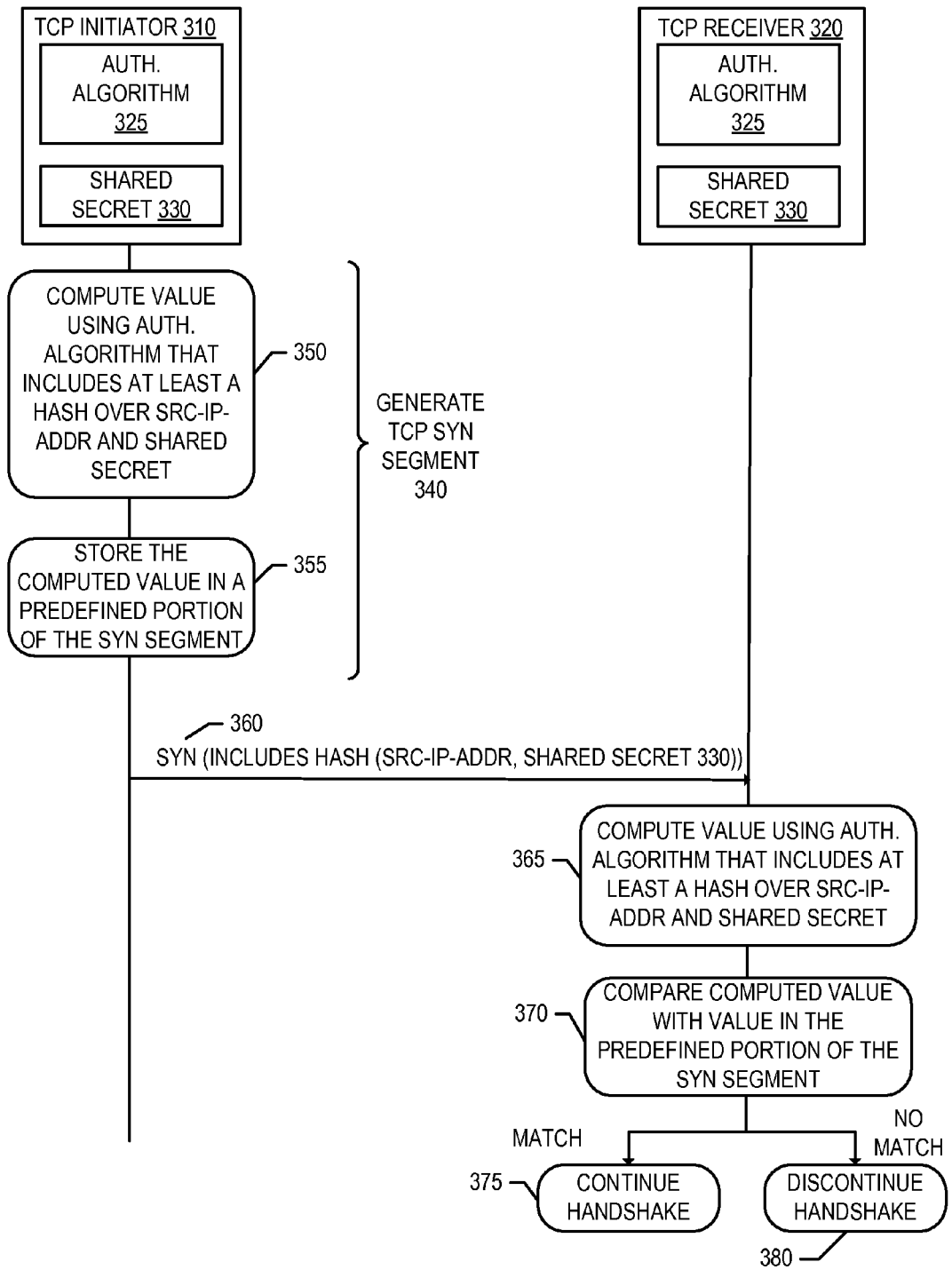
FIG. 3 illustrates a series of messages and operations for authenticating the identity of the initiator of a TCP connection according to one embodiment.

FIG. 3 illustrates a series of messages and operations for authenticating the identity of the initiator of a TCP connection according to one embodiment. As illustrated in FIG. 3, the TCP initiator 310 is initiating a TCP connection and transmits a TCP SYN message that is received by the TCP receiver 320. The TCP initiator 310 may be any device that executes an application that initiates a TCP connection. The TCP receiver 320 may be a TCP server that terminates the TCP connection (e.g., a web server that may or may not be an origin server) or may be a device that receives and analyzes TCP messages from TCP initiators that are destined to a TCP server (e.g., a firewall, a proxy, etc.). In a specific embodiment, the TCP initiator 310 is a proxy server (e.g., a transparent TCP proxy as previously described herein) and the TCP receiver 320 is a web server or firewall in front of a web server.

The TCP initiator 310 initiates a TCP connection by generating and transmitting a TCP SYN segment which starts the TCP handshake with a TCP server. The TCP initiator 310 uses the authentication algorithm 325 to include information in the generated TCP SYN segment that allows the TCP receiver 320 to determine, with a very high probability, whether the TCP initiator 310 is authorized to initiate a TCP connection with the TCP server. The authentication algorithm 325 includes at least the use of a cryptographic hash function that at least takes as input the source IP address of the IP packet that will encapsulate the TCP SYN segment, and a shared secret between the TCP initiator 310 and the TCP receiver 320. The cryptographic hash function is a hash function that produces a value (sometimes referred to as a hash value or hashed value) that bears seemingly no resemblance to the input and any change to the input will, with very high probability, change the value. Also, while the hashed value is relatively easy to compute, it is nearly impossible to derive the original input from the hashed value itself. By way of example, the cryptographic hash function may be the MD4, MD5, SHA-1, SHA-2, SHA-3, RIPEMD, PANAMA, WHIRLPOOL, or other cryptographic hash function.

At operation 340, the TCP initiator 310 generates 340 a TCP SYN segment. As part of generating the TCP SYN segment, at operation 350, the TCP initiator 310 executes the authentication algorithm 325 to compute a value (the initiator authentication value) that includes at least the use of a cryptographic hash function that takes as input at least a source IP address of the IP packet that will encapsulate the TCP SYN segment and a shared secret between the TCP initiator 310 and the TCP receiver 320 (as illustrated in FIG. 3, the shared secret 330).

The shared secret may be created and distributed to the TCP initiator 310 and/or the TCP receiver 320 in any number of ways. For example, the shared secret may be distributed through an API or other means (e.g., email, text message, installed locally, etc.). The shared secret may be unique to the pair of the TCP initiator 310 and the TCP receiver 320 or may be common to a group of TCP initiators including the TCP initiator 310 and the TCP receiver 320. For example, in embodiments where the TCP initiator 310 is one of multiple nodes in a content delivery network or other distributed network, the same shared secret may be used for each of those nodes and the TCP receiver 320.

The TCP initiator 310 stores the computed value in a predefined portion of the TCP SYN segment at operation 355. In one embodiment, the predefined portion is the TCP sequence number field. Thus in this embodiment, the TCP initiator 310 sets the TCP sequence number as the value computed in operation 350 (the "initiator authentication value"). By way of a specific example and assuming that the sequence number is 32 bits, the TCP sequence number is set as the result of a cryptographic hash function over the source IP address of the encapsulating IP packet and the shared secret. In another embodiment, the predefined portion is a TCP options field.

The TCP initiator 310 transmits the SYN segment 360 which will be received by the TCP receiver 320. The SYN segment 360 is encapsulated into an IP packet. The SYN segment 360 includes the computed value using at least the hash of the source IP address of the encapsulating IP packet and the shared secret 330. The shared secret 330 is not included in the SYN segment 360.

The TCP receiver 320 receives the SYN segment 360 and at operation 365 executes the same authentication algorithm 325 that uses a cryptographic hash function on at least the source IP address of the encapsulating IP packet and the shared secret 330 to compute a value (the receiver authentication value). The TCP receiver 320 then compares the computed value (the receiver authentication value) with the value in the predefined portion (the initiator authentication value) at operation 370. If the values match, then the TCP handshake continues at operation 375. For example, if the TCP receiver 320 is the TCP server (e.g., if it is a web server that will terminate the TCP connection), the TCP receiver 320 may transmit a TCP ACK segment and receive a TCP SYN-ACK segment in response to establish the TCP connection. As another example, if the TCP receiver 320 is not the TCP server (e.g., if it is not terminating the TCP connection), the TCP receiver 320 may transmit the TCP SYN message 360 to the TCP server to continue the TCP handshake if the values match. If the values do not match, then the TCP handshake is discontinued at operation 380. For example, the TCP receiver 320 drops the TCP SYN segment.

Figure 4:
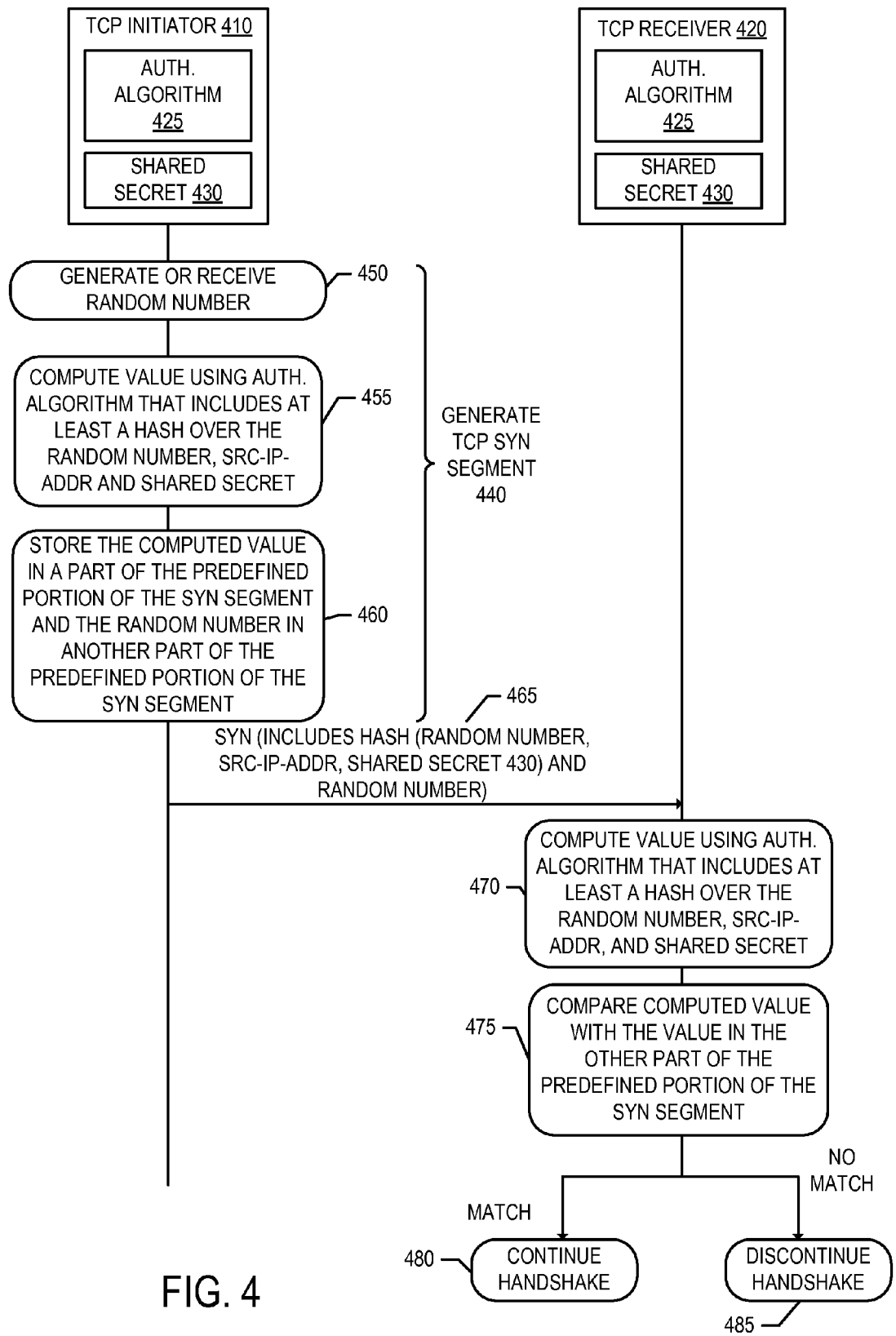
FIG. 4 illustrates a series of messages and operations for authenticating the identity of the initiator of a TCP connection according to another embodiment.

FIG. 4 illustrates a series of messages and operations for authenticating the identity of the initiator of a TCP connection according to another embodiment. As illustrated in FIG. 4, the TCP initiator 410 is initiating a TCP connection and transmits a TCP SYN message that is received by the TCP receiver 420. The TCP initiator 410 may be any device that executes an application that initiates a TCP connection. The TCP receiver 420 may be a TCP server that terminates the TCP connection or may be a device that receives and analyzes TCP SYN messages from TCP initiators that are destined to a TCP server (e.g., a firewall, a proxy, etc.). The TCP receiver 420 may be a web server and may or may not be an origin server that maintains web pages. In a specific embodiment, the TCP initiator 410 is a proxy server (e.g., a transparent TCP proxy as previously described herein) and the TCP receiver 420 is a web server or firewall in front of a web server.

The embodiment illustrated in FIG. 4 is an enhancement to the embodiment illustrated in FIG. 3 where a part of the predefined portion of the TCP segment is reserved such that the TCP initiator 410 sets that part to a random value and computes the initiator authentication value using the authentication algorithm with the cryptographic hash function further taking as input that random value, with the result stored in the remaining part of the predefined portion of the TCP segment. By way of a specific example if the predefined portion is the TCP sequence number field, the first 8 bits may be reserved for a random value and the remaining 24 bits may be used to store the cryptographic hash value on that random value, the source IP address of the encapsulating IP packet, and the shared secret between the TCP initiator and the TCP receiver. Upon receipt of the TCP SYN segment, the TCP receiver 420 extracts the reserved part of the predefined portion and uses the same authentication algorithm as the TCP initiator 410 to compute a value using the extracted part of the predefined portion, the source IP address of the encapsulating IP packet, and the shared secret between the TCP initiator and the TCP receiver.

The TCP receiver 420 compares the result of its computed value (the receiver authentication value) with the remaining portion of the predefined portion of the TCP segment that contains the initiator authentication value (the part other than the part reserved for the random value). If the values are the same, then the TCP handshake is allowed to continue. If the values are different, then the TCP handshake is not allowed to continue (e.g., the TCP receiver drops the TCP SYN segment). TCP receiver 420 continues with the TCP handshake. If the values are different, the TCP server 420 denies the connection.

The TCP initiator 410 initiates a TCP connection by beginning a TCP handshake by generating and transmitting a TCP SYN segment. The TCP initiator 410 uses the authentication algorithm 425 to include information in the generated TCP SYN segment that allows the TCP receiver 420 to determine, with a very high probability, whether the TCP initiator 410 is authorized to initiate a TCP connection with the TCP server. The authentication algorithm 425 includes at least the use of a cryptographic hash function that at least takes as input the source IP address of the IP packet that will encapsulate the TCP SYN segment, a shared secret between the TCP initiator 410 and the TCP receiver 420, and a random value. The cryptographic hash function may be similar to the cryptographic hash function described with reference to FIG. 3.

At operation 440, the TCP initiator 410 generates 440 a TCP SYN segment. As part of generating the TCP SYN segment, the TCP initiator 310 executes the authentication algorithm 425 that includes generating a random number or receiving a random number at operation 450. The random number may be generated using any number of random number generation algorithms. By way of example, the random number may be generated using a pseudorandom number generator (PRNG), a cryptographically secure pseudorandom number generator (CSPRNG), or a hardware random number generator. The random number may also be received from a random number server.

The authentication algorithm 425 also includes computing a value (the initiator authentication value) using at least a cryptographic hash function that takes as input at least the random number, a source IP address of the IP packet that will encapsulate the TCP SYN segment, and a shared secret between the TCP initiator 410 and the TCP receiver 420 (as illustrated in FIG. 4, the shared secret 430). The shared secret may be created and distributed to the TCP initiator 410 and/or the TCP receiver 420 in a similar way as described with reference to FIG. 3.

The TCP initiator 410 stores the computed value in a part of the predefined portion of the TCP SYN segment and stores the random number in another part of the predefined portion of the TCP SYN segment at operation 455. In one embodiment, the predefined portion is the TCP sequence number field. By way of a specific example if the predefined portion is the TCP sequence number field, the first 8 bits may be reserved for the random value and the remaining 24 bits may be used to store the cryptographic hash value on that random value, the source IP address of the encapsulating IP packet, and the shared secret between the TCP initiator and the TCP receiver. In another embodiment, the predefined portion is a TCP options field where a portion of the field stores the random number and another portion stores the computed value.

The TCP initiator 410 transmits the SYN segment 465 that is received by the TCP receiver 420. The SYN segment 465 includes the computed value (the initiator authentication value) using at least the hash of the random number, source IP address of the encapsulating IP packet and the shared secret 430. The SYN segment 465 also includes the random number. The shared secret 430 is not included in the SYN segment 365.

The TCP receiver 420 receives the SYN segment 465 and at operation 470 executes the same authentication algorithm 425 to compute a value (the receiver authentication value) using at least a cryptographic hash function on at least the random number, source IP address of the encapsulating IP packet, and the shared secret 430. The TCP receiver 420 then compares the computed value (the receiver authentication value) with the value included in the other part of the predefined portion (other than the reserved part) that includes the initiator authentication value at operation 475. If the values match, then the TCP handshake continues at operation 380. For example, if the TCP receiver 420 is the TCP server (e.g., if it is a web server that will terminate the TCP connection), the TCP receiver 420 may transmit a TCP ACK segment and receive a TCP SYN-ACK segment in response to establish the TCP connection. As another example, if the TCP receiver 420 is not the TCP server (e.g., if it is not terminating the TCP connection), the TCP receiver 420 may transmit the TCP SYN message 465 to the TCP server to continue the TCP handshake if the values match. If the values do not match, then the TCP handshake is discontinued at operation 385. For example, the TCP receiver 420 drops the TCP SYN segment.

Figure 5:
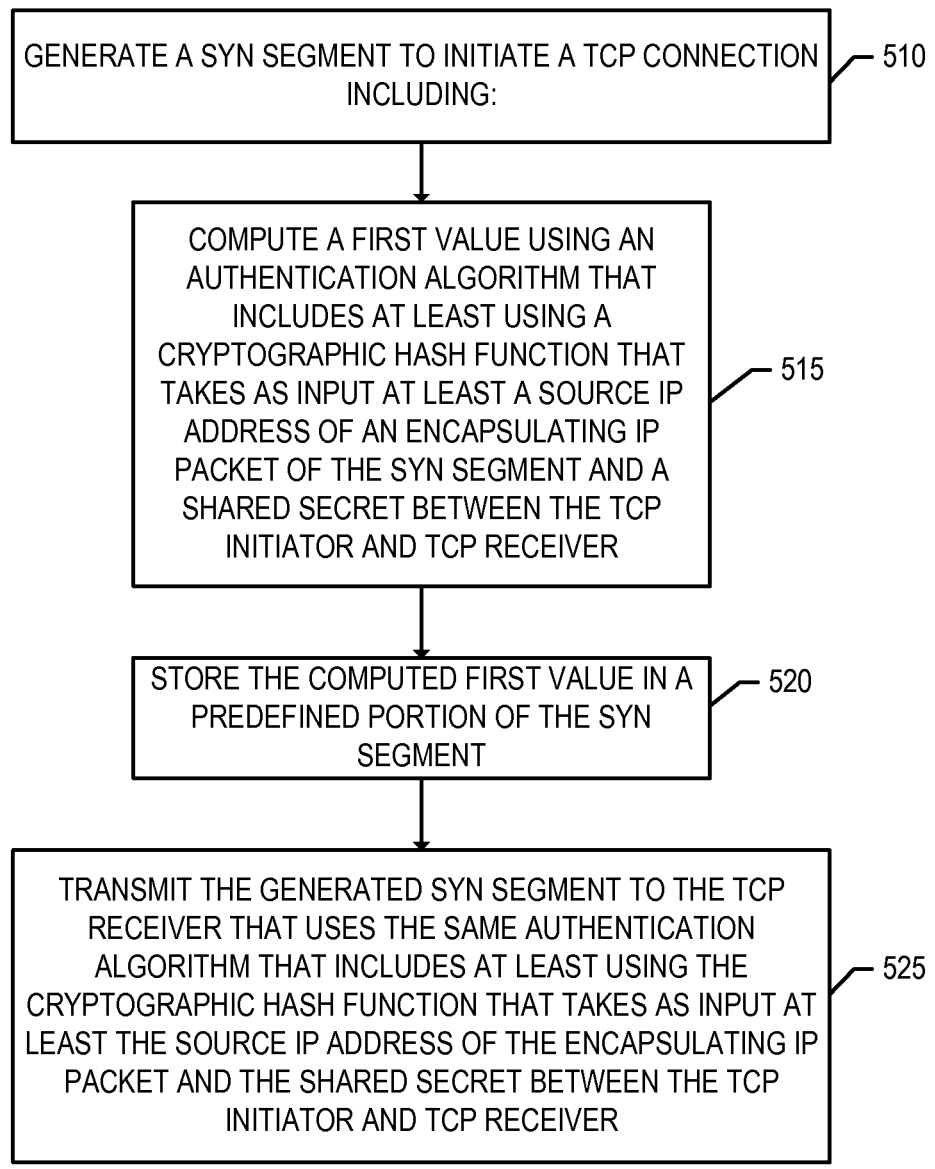
FIG. 5 is a flow diagram that illustrates exemplary operations for authenticating the identity of the initiator of a TCP connection according to one embodiment.

FIG. 5 is a flow diagram that illustrates exemplary operations for authenticating the identity of the initiator of a TCP connection according to one embodiment. The operations of FIG. 5 may be performed by a TCP initiator that is initiating a TCP connection with a TCP server.

At operation 510, the TCP initiator generates a TCP SYN segment to initiate a TCP connection. As part of generating the TCP SYN segment, the TCP initiator performs operations 515 and 520. At operation 515, the TCP initiator computes a first value (the initiator authentication value) using an authentication algorithm that includes at least using a cryptographic hash function that takes as input at least a source IP address of the IP packet that will encapsulate the TCP SYN segment and a shared secret between the TCP initiator and the TCP receiver. The cryptographic hash function may be similar to the cryptographic hash functions previously described herein. The shared secret between the TCP initiator and the TCP receiver may also be generated and/or distributed to the TCP initiator and the TCP receiver as previously described herein. In one embodiment, the first value is a cryptographic hash value produced by the cryptographic hash function or a portion of the cryptographic hash value produced by the cryptographic hash function. Flow moves from operation 515 to operation 520.

At operation 520, the TCP initiator stores the computed first value in a predefined portion of the SYN segment. In one embodiment, the predefined portion of the SYN segment is a TCP sequence number field. In another embodiment, the predefined portion of the SYN segment is a TCP options field. The TCP initiator does not store the shared secret in the SYN segment.

In one embodiment, the cryptographic hash function also takes as input a second value, which may be a random value that may be generated or received as previously described herein. In such an embodiment, the TCP initiator stores the second value in another predefined portion of the SYN segment. By way of a specific example, if the predefined portion is the TCP sequence number, the first 8 bits of the sequence number is reserved for the second value and the remaining 24 bits is used to store the cryptographic hash value on that random value, the source IP address of the encapsulating IP packet, and the shared secret between the TCP initiator and the TCP receiver. Flow moves from operation 520 to operation 525.

At operation 525, the TCP initiator transmits the generated TCP SYN segment, which will be received by the TCP receiver that will use the same authentication algorithm to authenticate the identity of the TCP initiator and authorize the TCP connection. For example, the TCP receiver will compute a third value using the same authentication algorithm that includes at least using the same cryptographic hash function over the source IP address of the encapsulating IP packet and the shared secret between the TCP initiator and the TCP receiver. If a second value (e.g., random number) is also used as part of computing the first value (the initiator authentication value), the TCP receiver will further use the second value when computing the third value (the receiver authentication value).

Figure 6:
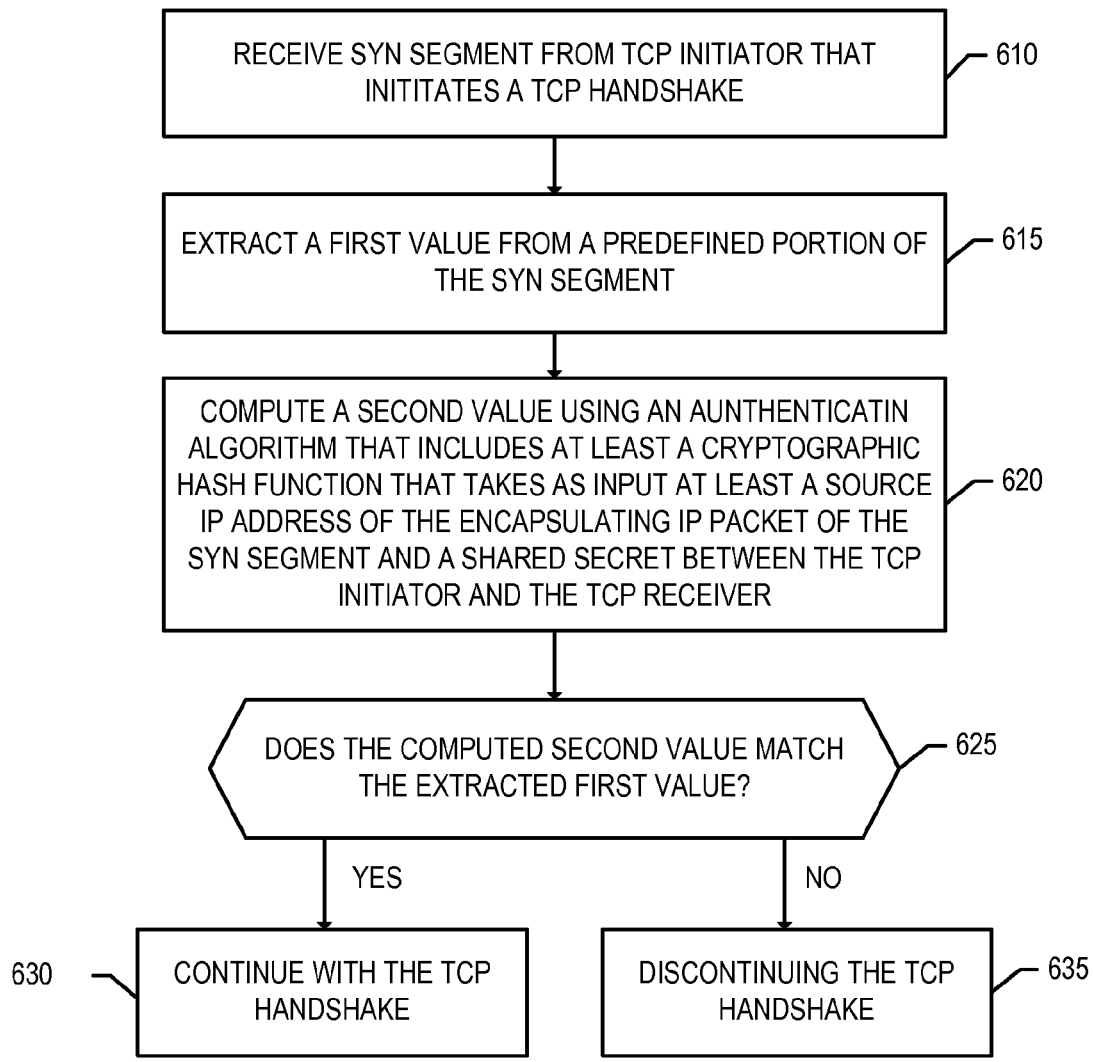
FIG. 6 is a flow diagram that illustrates exemplary operations for authenticating the identity of the initiator of a TCP connection according to one embodiment.

FIG. 6 is a flow diagram that illustrates exemplary operations for authenticating the identity of the initiator of a TCP connection according to one embodiment. The operations of FIG. 6 may be performed by a TCP receiver that receives TCP connection requests from TCP initiators.

At operation 610, the TCP receiver receives a TCP SYN segment from a TCP initiator that initiates a TCP handshake. After receiving the TCP SYN segment, the TCP receiver executes an authentication algorithm to determine whether the TCP SYN segment is received from a client that is authorized to initiate a TCP connection with the TCP server.

Flow then moves to operation 615 where the TCP receiver extracts a first value from a predefined portion of the TCP SYN segment. The first value is used by the TCP receiver to determine whether the TCP SYN segment is being transmitted from an authorized TCP initiator. The predefined portion is defined according to the authentication algorithm. In one embodiment, the predefined portion is the TCP sequence number field. In another embodiment, the predefined portion is a TCP options field. The TCP SYN segment does not include the shared secret between the TCP initiator and the TCP receiver. Flow then moves to operation 620.

At operation 620, the TCP receiver computes a second value using the authentication algorithm that includes at least a cryptographic hash function that takes as input at least a source IP address of the encapsulating IP packet and a shared secret between the TCP initiator and the TCP receiver. The cryptographic hash function should be the same cryptographic hash function used by the TCP initiator (if the TCP initiator is an authorized TCP initiator). Flow moves from operation 620 to operation 625.

In an embodiment where the TCP initiator further computes the first value based on a third value (e.g., the cryptographic hash function is over the source IP address, the shared secret, and a random number), the TCP receiver also extracts the third value from another predefined portion of the SYN segment (which may or may not be a different portion of the same field as the extracted first value) and computes the second value using the extracted third value (e.g., the server computes a hash over the source IP address, the shared secret, and the random number).

At operation 625, the TCP receiver determines whether the computed second value matches the extracted first value. A match indicates with a very high probability that the TCP initiator knows the shared secret and is thus authorized to initiate a TCP connection with the TCP receiver. If the values do not match, then this is an indication that the TCP connection is being requested from an unauthorized TCP initiator.

If the values match, then flow moves to operation 630 where the TCP handshake continues. For example, if the TCP receiver is the TCP server (e.g., if it is a web server that will terminate the TCP connection), the TCP receiver may transmit a TCP ACK segment and receive a TCP SYN-ACK segment in response to establish the TCP connection. As another example, if the TCP receiver is not the TCP server (e.g., if it is not terminating the TCP connection), the TCP receiver may transmit the TCP SYN message to the TCP server to continue the TCP handshake if the values match.

If the values do not match, then flow moves to operation 635 where the TCP receiver discontinues the TCP handshake. For example, the TCP receiver 320 drops the TCP SYN segment.

Figure 7:
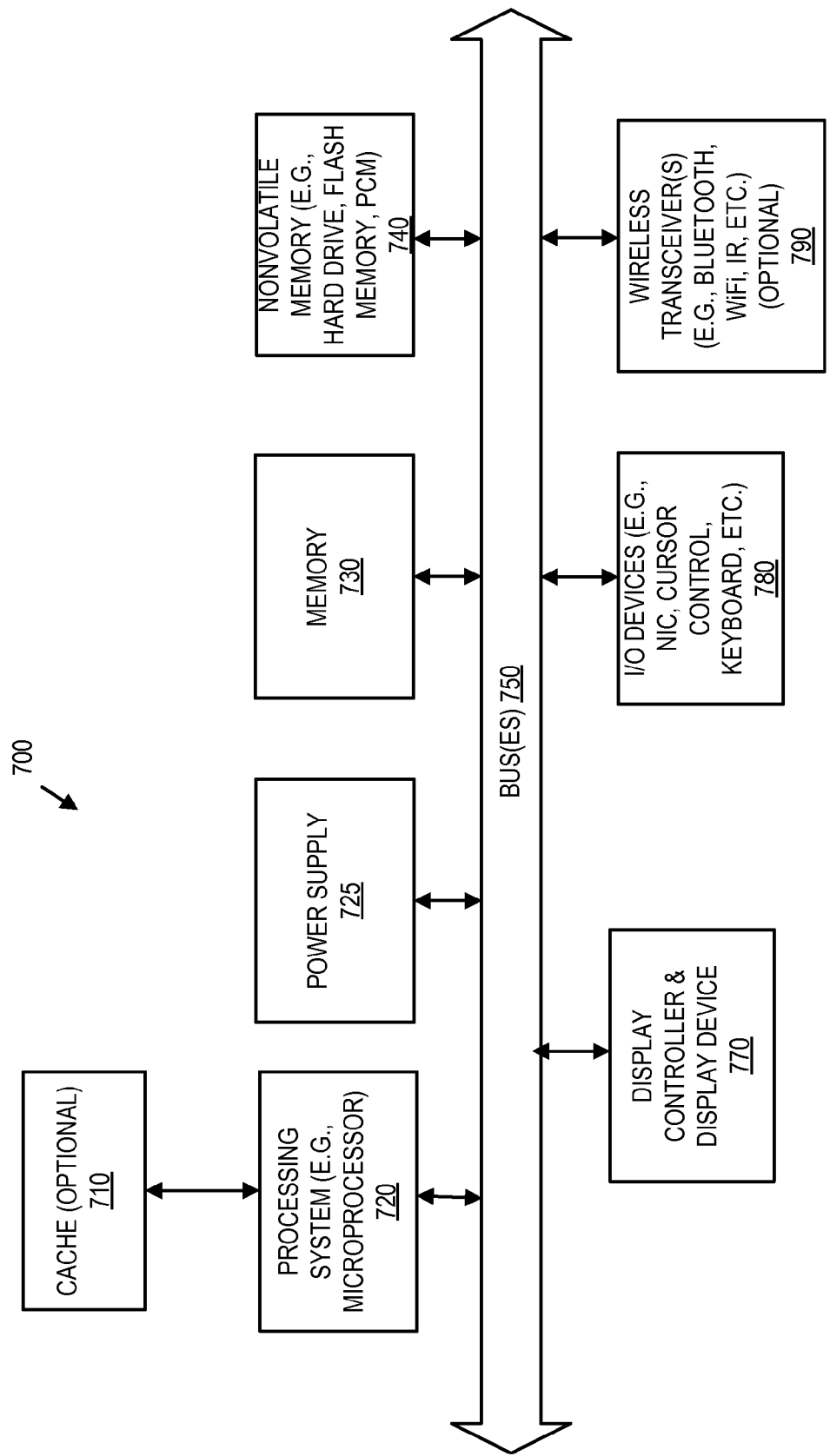
FIG. 7 illustrates an exemplary computing device that may be used in some embodiments.

As illustrated in FIG. 7, the computing device 700, which is a form of a data processing system, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations described herein. The bus 750 interconnects the above components together and also interconnects those components to the display controller & display device 770, Input/Output devices 780 (e.g., NIC (Network Interface Card), a cursor control (e.g., mouse, touchscreen, touchpad, etc.), a keyboard, etc.), and the wireless transceiver(s) 790 (e.g., Bluetooth, WiFi, Infrared, etc.). One or more of the components of the computing device 700 may be optional (e.g., the display controller and display device 770, I/O devices 780, the wireless transceiver(s) 790, etc.). In one embodiment, the TCP client 110, transparent TCP proxy 120, the TCP server 130, the TCP initiator 310, and/or the TCP receiver 320 can take the form of the computing device 700.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a client device, a server, etc.). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a transparent Transmission Control Protocol (TCP) proxy for transparent bridging of TCP connections, comprising:

intercepting a first TCP SYN packet sent from a TCP client and destined for a TCP server that initiates a TCP connection between the TCP client and the TCP server;

transmitting a first TCP SYN-ACK packet to the TCP client as if the transparent TCP proxy is the TCP server in response to intercepting the first TCP SYN packet, wherein the first TCP SYN-ACK packet includes a first sequence number that is chosen by the transparent TCP proxy, wherein the first sequence number is a first initial sequence number (ISN);

intercepting a first TCP ACK packet sent from the TCP client and destined for the TCP server in response to transmitting the first TCP SYN-ACK packet, wherein the first TCP ACK packet acknowledges receipt of the TCP client of the first TCP SYN-ACK packet;

transmitting, in response to intercepting the first TCP ACK packet, a second TCP SYN packet to the TCP server as if the transparent TCP proxy is the TCP client, wherein the second TCP SYN packet is substantially the same as the first TCP SYN packet;

intercepting a second TCP SYN-ACK packet sent from the TCP server and destined for the TCP client in response to transmitting the second TCP SYN packet to the TCP server, wherein the second TCP SYN-ACK packet includes a second sequence number that is chosen by the TCP server, wherein the second sequence number is a second ISN;

transmitting a second TCP ACK packet to the TCP server as if the transparent TCP proxy is the TCP client in response to intercepting the second TCP SYN-ACK packet;

calculating and storing a difference between the first ISN included in the first TCP SYN-ACK packet and the second ISN included in the second TCP SYN-ACK packet;

intercepting a first data packet sent from the TCP client and destined for the TCP server, wherein the first data packet includes a first acknowledgement number based on the first sequence number, and wherein the first data packet includes a first TCP checksum;

updating the first acknowledgement number to a second acknowledgement number using the difference between the first ISN and the second ISN so that the updated acknowledgement number is a value that is expected by the TCP server;

calculating a second TCP checksum that uses the second acknowledgement number instead of the first acknowledgement number;

transmitting a second data packet to the TCP server as if the transparent TCP proxy is the TCP client, wherein the second data packet includes the second acknowledgement number and the second TCP checksum;

intercepting a third data packet sent from the TCP server and destined for the TCP client, wherein the third data packet includes a third TCP checksum and a third sequence number;

updating the third sequence number to a fourth sequence number using the difference between the first sequence number and the second sequence number so that the fourth sequence number is a value that is expected by the TCP client;

calculating a fourth TCP checksum that uses the fourth sequence number instead of the third sequence number; and transmitting a fourth data packet to the TCP client as if the transparent TCP proxy is the TCP server, wherein the fourth data packet includes the fourth TCP checksum and the fourth sequence number.

2. The method of claim 1, further comprising:
wherein the first sequence number is a TCP SYN cookie;
wherein the first TCP ACK packet includes a fifth acknowledgement number; and
prior to transmitting the second TCP SYN packet to the TCP server, determining that the fifth acknowledgement number is an incremented value by one of the TCP SYN cookie and determining that the TCP SYN cookie is valid and has not expired.

3. The method of claim 1, wherein the transparent TCP proxy is implemented on a network interface card of the TCP server.

4. The method of claim 1, wherein the transparent TCP proxy is physically separate from the TCP server and connected across a network.

5. The method of claim 1, wherein the transparent TCP proxy does not implement a full TCP state machine.

6. A transparent Transmission Control Protocol (TCP) proxy device, comprising:
a non-transitory computer-readable storage medium that stores code;
a set of one or more processors coupled to the non-transitory computer-readable storage medium that is operative to execute the code, the code including:
a TCP bridging module that is configured to be coupled with a first interface that is to be coupled with a TCP client and a second interface that is to be coupled with a TCP server, wherein the TCP bridging module is configured to perform the following:
intercept and respond to a first TCP connection request received from the TCP client and destined for the TCP server via the first interface as if acting as the TCP server including acting as the TCP server in a first three-way handshake with the TCP client including selecting a first initial sequence number (ISN);
only after completion of the first three-way handshake with the TCP client, participate in a second three-way handshake with the TCP server via the second interface as if acting as the TCP client without the TCP client receiving any TCP packets of the second three-way handshake including intercepting a SYN-ACK packet from the TCP server that includes a second initial sequence number (ISN) selected by the TCP server;
intercept and translate subsequent TCP packets received from the TCP client at the first interface and destined for the TCP server into a form expected by the TCP server including performing the following for each of these intercepted TCP packets:
update an acknowledgement number of that TCP packet to a number expected by the TCP server using a difference between the first ISN and the second ISN,
update a TCP checksum of that TCP packet considering the updated acknowledgement number; and
transmit that TCP packet with the updated acknowledgement number and the updated TCP checksum to the TCP server as if acting as the TCP client; and
intercept and translate subsequent TCP packets received from the TCP server at the second interface and destined for the TCP client into a form expected by the TCP client including performing the following for each of these intercepted TCP packets:
update a sequence number of that TCP packet to a number expected by the TCP client using the difference between the first ISN and the second ISN,
update a TCP checksum of that TCP packet considering the updated sequence number, and
transmit that TCP packet with the updated sequence number and the updated TCP checksum to the TCP client as if acting as the TCP server.

7. The transparent TCP proxy device of claim 6, wherein the TCP bridging module is configured to update the TCP checksum of the subsequent TCP packets received from the TCP client at the first interface by performing the following:
for an initial one of the intercepted TCP packets,
recompute the TCP checksum with the updated acknowledgement number,
compute a difference between the TCP checksum included in that TCP packet and the recomputed TCP checksum with the updated acknowledgement number, and
store the TCP checksum difference; and
for each additional one of the intercepted TCP packets, using the stored TCP checksum difference to update the TCP checksum of that packet.

8. The transparent TCP proxy device of claim 6, wherein the TCP bridging module is configured to update the TCP checksum of the subsequent TCP packets received from the TCP server at the second interface by performing the following:
for an initial one of the intercepted TCP packets,
recompute the TCP checksum with the updated sequence number,
compute a difference between the TCP checksum included in that TCP packet and the recomputed TCP checksum with the updated sequence number, and
store the TCP checksum difference; and
for each additional one of the intercepted TCP packets, using the stored TCP checksum difference to update the TCP checksum of that packet.

9. The transparent TCP proxy device of claim 6, wherein the TCP bridging module is configured to select the first ISN to be a TCP SYN cookie, and wherein the TCP bridging module is configured to complete the first three-way handshake with the TCP client only after a determination that the TCP client responded with TCP ACK packet that has an acknowledgement number based on the TCP SYN cookie and that the TCP SYN cookie is valid and not expired.

10. The transparent TCP proxy device of claim 6, wherein the transparent TCP proxy device is physically separate from the TCP server and is connected to the TCP server across a network.

11. The transparent TCP proxy device of claim 6, wherein the transparent TCP proxy device is implemented on a network interface card of the TCP server.

12. The transparent TCP proxy device of claim 6, wherein the transparent TCP proxy device does not implement a full TCP state machine.

13. An apparatus operative as a Transmission Control Protocol (TCP) proxy, comprising:
  a set of one or more processors;
  a non-transitory computer-readable storage medium that stores instructions, that when executed by the set of processors, cause the set of processors to perform the following:
    intercept a first TCP SYN packet sent from a TCP client and destined for a TCP server that initiates a TCP connection between the TCP client and the TCP server;
    transmit a first TCP SYN-ACK packet to the TCP client as if the transparent TCP proxy is the TCP server in response to intercepting the first TCP SYN packet, wherein the first TCP SYN-ACK packet includes a first sequence number that is chosen by the transparent TCP proxy, wherein the first sequence number is a first initial sequence number (ISN);
    intercept a first TCP ACK packet sent from the TCP client and destined for the TCP server in response to transmitting the first TCP SYN-ACK packet, wherein the first TCP ACK packet acknowledges receipt of the TCP client of the first TCP SYN-ACK packet;
    transmit, in response to intercepting the first TCP ACK packet, a second TCP SYN packet to the TCP server as if the transparent TCP proxy is the TCP client, wherein the second TCP SYN packet is substantially the same as the first TCP SYN packet;
    intercept a second TCP SYN-ACK packet sent from the TCP server and destined for the TCP client in response to transmitting the second TCP SYN packet to the TCP server, wherein the second TCP SYN-ACK packet includes a second sequence number that is chosen by the TCP server, wherein the second sequence number is a second ISN;
    transmit a second TCP ACK packet to the TCP server as if the transparent TCP proxy is the TCP client in response to intercepting the second TCP SYN-ACK packet;
    calculate and store a difference between the first ISN included in the first TCP SYN-ACK packet and the second ISN included in the second TCP SYN-ACK packet;
    intercept a first data packet sent from the TCP client and destined for the TCP server, wherein the first data packet includes a first acknowledgement number based on the first sequence number, and wherein the first data packet includes a first TCP checksum;
    update the first acknowledgement number to a second acknowledgement number using the difference between the first ISN and the second ISN so that the updated acknowledgement number is a value that is expected by the TCP server;
    calculate a second TCP checksum that uses the second acknowledgement number instead of the first acknowledgement number;
    transmit a second data packet to the TCP server as if the transparent TCP proxy is the TCP client, wherein the second data packet includes the second acknowledgement number and the second TCP checksum;
    intercept a third data packet sent from the TCP server and destined for the TCP client, wherein the third data packet includes a third TCP checksum and a third sequence number;
    update the third sequence number to a fourth sequence number using the difference between the first sequence number and the second sequence number so that the fourth sequence number is a value that is expected by the TCP client;
    calculate a fourth TCP checksum that uses the fourth sequence number instead of the third sequence number;
    transmit a fourth data packet to the TCP client as if the transparent TCP proxy is the TCP server, wherein the fourth data packet includes the fourth TCP checksum and the fourth sequence number.

14. The apparatus of claim 13, further comprising:
  wherein the first sequence number is a TCP SYN cookie;
  wherein the first TCP ACK packet includes a fifth acknowledgement number; and
  wherein the non-transitory computer-readable storage medium further stores instructions, that when executed by the set of processors, cause the set of processors to perform the following:
    prior to transmission of the second TCP SYN packet to the TCP server, determine that the fifth acknowledgement number is an incremented value by one of the TCP SYN cookie and determine that the TCP SYN cookie is valid and has not expired.

15. The apparatus of claim 13, wherein the apparatus is a transparent TCP proxy and is implemented on a network interface card of the TCP server.

16. The apparatus of claim 13, wherein the apparatus is a transparent TCP proxy and is physically separate from the TCP server and connected across a network.

17. The apparatus of claim 13, wherein the apparatus is a transparent TCP proxy and does not implement a full TCP state machine.

* * * * *